US012092880B2

(12) United States Patent
Fini et al.

(10) Patent No.: US 12,092,880 B2
(45) Date of Patent: Sep. 17, 2024

(54) BEAM STEERING STRUCTURE WITH INTEGRATED POLARIZATION SPLITTER

(71) Applicant: Ayar Labs, Inc., Santa Clara, CA (US)

(72) Inventors: John Fini, Albany, CA (US); Roy Edward Meade, Lafayette, CA (US); Derek Van Orden, San Francisco, CA (US); Mark Wade, Berkeley, CA (US)

(73) Assignee: Ayar Labs, Inc., San Jose, CA (US)

( * ) Notice: Subject to any disclaimer, the term of this patent is extended or adjusted under 35 U.S.C. 154(b) by 243 days.

(21) Appl. No.: 17/700,367

(22) Filed: Mar. 21, 2022

(65) Prior Publication Data

US 2022/0214509 A1    Jul. 7, 2022

Related U.S. Application Data

(63) Continuation of application No. 16/440,903, filed on Jun. 13, 2019, now Pat. No. 11,280,970.

(60) Provisional application No. 62/684,904, filed on Jun. 14, 2018.

(51) Int. Cl.
*G02B 6/42* (2006.01)

(52) U.S. Cl.
CPC ......... *G02B 6/4214* (2013.01); *G02B 6/4206* (2013.01); *G02B 6/4212* (2013.01); *G02B 6/423* (2013.01)

(58) Field of Classification Search
CPC .. G02B 6/4213; G02B 6/4214; G02B 6/4206; G02B 6/4212; G02B 6/423; G02B 6/3652; G02B 6/4243; G02B 6/30
See application file for complete search history.

(56) References Cited

U.S. PATENT DOCUMENTS 10,469,195 B2 * 11/2019 Sahni .................. G02B 6/4215

* cited by examiner

*Primary Examiner* — John Bedtelyon
(74) *Attorney, Agent, or Firm* — Penilla IP, APC

(57) ABSTRACT

A beam steering structure includes an alignment structure shaped to receive and align an optical fiber such that an axis of a core of the optical fiber is oriented in a first direction. The beam steering structure includes an end portion having an angled optical surface oriented at a non-zero angle relative to the first direction. The end portion is shaped and positioned so that light propagating along the first direction from the optical fiber passes through the end portion to reach the angled optical surface. A reflecting system is positioned on the angled optical surface across the first direction. The reflecting system is configured to reflect incident light propagating along the first direction into a first reflected beam of a first polarization and a second reflected beam of a second polarization. The first and second reflected beams are directed into first and second optical communication channels, respectively.

20 Claims, 14 Drawing Sheets

(View A-A)

(View B-B)

(View C-C)

⎯ 2101

Position an optical fiber in an alignment structure of a beam steering structure such that an axis of a core of an optical fiber is oriented in a first direction within the alignment structure, where the first direction is oriented toward a reflecting system positioned on an angled optical surface of an end portion of the beam steering structure, where the angled optical surface is oriented at a non-zero angle relative to the first direction, where the reflecting system is configured to reflect incident light propagating along the first direction into a first reflected beam of a first polarization and a second reflected beam of a second polarization, where the first reflected beam and the second reflected beam are separated by a beam spacing sized to direct the first reflected beam into a first optical communication channel and to direct the second reflected beam into a second optical communication channel.

⎯ 2103

Transmit light through the optical fiber so that the light travels from the optical fiber in the first direction and is incident upon the reflecting system, where the light incident upon the reflecting system is split into the first reflected beam and the second reflected beam.

Fig. 21

BEAM STEERING STRUCTURE WITH INTEGRATED POLARIZATION SPLITTER

CLAIM OF PRIORITY

This application is a continuation application under 35 U.S.C. 120 of prior U.S. Non-Provisional application Ser. No. 16/440,903, filed on Jun. 13, 2019, which claims priority under 35 U.S.C. 119(e) to U.S. Provisional Patent Application No. 62/684,904, filed Jun. 14, 2018. The disclosure of each above-identified application is incorporated herein by reference in its entirety for all purposes.

BACKGROUND

1. Field of the Invention

The present invention relates to optical data communication.

2. Description of the Related Art

Optical data communication systems operate by modulating laser light to encode digital data patterns. The modulated laser light is transmitted through an optical data network from a sending node to a receiving node. The modulated laser light having arrived at the receiving node is de-modulated to obtain the original digital data patterns. Therefore, implementation and operation of optical data communication systems is dependent upon having reliable and efficient mechanisms for transmitting laser light and detecting laser light at different nodes within the optical data network. In this regard, it can be necessary to transmit laser light from an optical fiber to a chip, and vice-versa. It is within this context that the present invention arises.

SUMMARY

In an example embodiment, a beam-turning assembly is disclosed. The beam-turning assembly includes a beam steering structure that includes an alignment structure shaped to receive and align an optical fiber such that an axis of a core of the optical fiber is oriented in a first direction within the alignment structure. The beam steering structure includes an end portion having an angled optical surface oriented at a non-zero angle relative to the first direction. The end portion is shaped and positioned so that light propagating along the first direction from the optical fiber in the alignment structure passes through the end portion to reach the angled optical surface. The beam-turning assembly includes a reflecting system positioned on the angled optical surface across the first direction so that light propagating along the first direction through the end portion is incident upon the reflecting system at the angled optical surface. The reflecting system is configured to reflect incident light propagating along the first direction into a first reflected beam of a first polarization and a second reflected beam of a second polarization. The first reflected beam and the second reflected beam are separated by a beam spacing sized to direct the first reflected beam into a first optical communication channel and to direct the second reflected beam into a second optical communication channel.

In another example embodiment, a beam-turning assembly is disclosed. The beam-turning assembly includes a beam steering structure that includes an alignment structure shaped to receive and align an optical fiber such that an axis of a core of the optical fiber is oriented in a first direction within the alignment structure. The beam steering structure includes an end portion having an angled optical surface oriented at an angle relative to the first direction. The beam-turning assembly includes a reflecting system positioned on the angled optical surface across the first direction so that light propagating along the first direction from the optical fiber is incident upon the reflecting system. The reflecting system is configured to reflect incident light propagating along the first direction into a first reflected beam of a first polarization and a second reflected beam of a second polarization. The first reflected beam and the second reflected beam are separated by a beam spacing sized to direct the first reflected beam into a first optical communication channel and to direct the second reflected beam into a second optical communication channel. The end portion of the beam steering structure is shaped and positioned so that the first reflected beam and the second reflected beam do not pass through the beam steering structure.

In another example embodiment, a method is disclosed for optical beam turning in an optical data communication system. The method includes an operation for positioning an optical fiber in an alignment structure of a beam steering structure such that an axis of a core of the optical fiber is oriented in a first direction within the alignment structure. The first direction is oriented toward a reflecting system positioned on an angled optical surface of an end portion of the beam steering structure. The angled optical surface is oriented at a non-zero angle relative to the first direction. The reflecting system is configured to reflect incident light propagating along the first direction into a first reflected beam of a first polarization and a second reflected beam of a second polarization. The first reflected beam and the second reflected beam are separated by a beam spacing sized to direct the first reflected beam into a first optical communication channel and to direct the second reflected beam into a second optical communication channel. The method also includes an operation for transmitting light through the optical fiber so that the light travels from the optical fiber in the first direction and is incident upon the reflecting system. The light incident upon the reflecting system is split into the first reflected beam and the second reflected beam.

BRIEF DESCRIPTION OF THE DRAWINGS

FIG. 21 shows a flowchart of a method for optical beam turning in an optical data communication system, in accordance with some embodiments.

DETAILED DESCRIPTION

Figure 1:
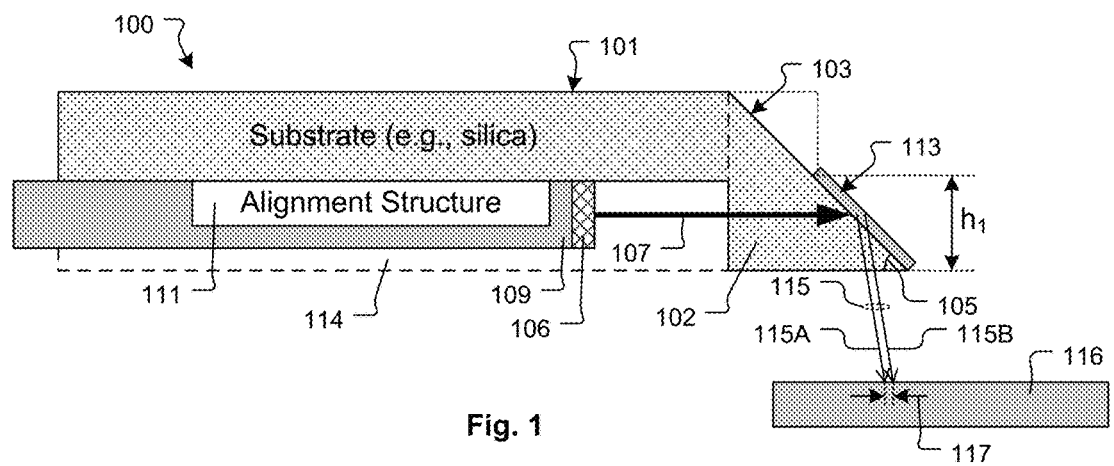
FIG. 1 shows a vertical cross-section view of a beam-turning assembly 100 that includes a beam steering structure, in accordance with some embodiments.

In the following description, numerous specific details are set forth in order to provide an understanding of the present invention. It will be apparent, however, to one skilled in the art that the present invention may be practiced without some or all of these specific details. In other instances, well known process operations have not been described in detail in order not to unnecessarily obscure the present invention.

In fiber-optic data communication systems, polarizing beam (i.e., light beam) splitters pass light of one polarization in a first direction, while re-directing light of a second polarization in a different direction. Such a function may be accomplished using Bragg-reflector stacks sandwiched between two prisms, and having index values meeting the Brewster condition, such that the Bragg reflection is highly polarization sensitive. These types of beam splitters are suitable for free-space applications using bulk optical components, and can be incorporated into discrete fiber-coupled components.

Also, in fiber-optic data communication systems, light is coupled from an optical fiber to a photonic chip, and vice-versa, and various approaches are being explored for fiber-to-chip coupling, one goal of which is to achieve scalable manufacturing of packaged devices incorporating integrated optics. Various embodiments for coupling light from an optical fiber to a photonic chip implement edge-coupling techniques and/or vertical-coupling techniques. In some edge-coupling techniques, light is coupled at the edge of a chip to fibers parallel and flush with on-chip waveguides. In some vertical-coupling techniques, a beam-turning element is implemented to allow horizontal packaging of fibers, which can improve the mechanically robustness of a packaged device, i.e., of a photonic chip within optical fiber(s) attached thereto. Also, in some packaged device configurations, a beam-turning connector for fiber-to-chip coupling can utilize one or more bent fiber(s), where multiple fibers can be ribbonized for scalability.

One challenge in fiber-to-chip coupling is that fibers typically carry light of two polarizations, while on-chip devices and waveguides are commonly single-polarization, so that a polarization multiplexing function is required. In some embodiments, this polarization multiplexing function can be achieved using an on-chip dual-polarization grating coupler, a type of vertical coupler that couples light from each of two on-chip waveguides to a different fiber polarization. However, because dual-polarization grating couplers can have substantially higher loss than single-polarization grating couplers, it can be beneficial to separate implementation of the polarization multiplexing function from the grating coupler.

With the above-mentioned issues in mind, it should be noted that polarizing beam-splitters employing multilayer dielectric stacks are not generally suitable for use in fiber-to-chip coupling, as they do not provide high-density connectivity or scalable manufacturing as needed for coupling of fibers to integrated devices. However, a beam-turning assembly is disclosed herein for high-density connectivity that includes a polarizing beam-splitter that is suitable for use in a fiber-to-chip coupler.

It is noted that in many applications, on-chip devices and waveguides may operate with both polarizations, allowing, for example, two separate communication channels. In such cases, the invention disclosed herein could be used to transmit signals with two separate polarizations, via two separate grating couplers, to the same output fiber, thus enhancing system capacity with comparable packaging costs.

FIG. 1 shows a vertical cross-section view of a beam-turning assembly 100 that includes a beam steering structure 101, in accordance with some embodiments. The beam steering structure 101 includes an end portion 102 having an angled optical surface 103 angled at a surface angle 105 measured relative to a direction of propagation of an input optical beam 107, i.e., relative to an axis of a core of an optical fiber 109, when the optical fiber 109 is positioned in an alignment structure 111 of the beam steering structure 101. In other words, with the direction of propagation of the input optical beam 107 considered as a first direction, the angled optical surface 103 is oriented at the surface angle 105 which is a non-zero angle relative to the first direction. In some embodiments, the alignment structure 111 is shaped to receive and align the optical fiber 109 such that the above-mentioned first direction is substantially parallel to a surface of optical incidence of a use device 116, e.g., of a photonic chip. In some embodiments, the alignment structure 111 is shaped to receive and align the optical fiber 109 such that the above-mentioned first direction is not parallel to a surface of optical incidence of the use device 116. The alignment structure 111 is shaped to receive and align the optical fiber 109 such that the axis of the core of the optical fiber 109 is oriented in the above-mentioned first direction, as indicated by the arrow representing the input optical beam 107. In some embodiments, the alignment structure 111 is a v-groove into which the optical fiber 109 is positioned. The end portion 102 is shaped and positioned so that light propagating along the above-mentioned first direction from the optical fiber 109 in the alignment structure 111 passes through the end portion 102 to reach the angled optical surface 103.

A reflecting system 113 is disposed on the angled optical surface 103 to extend over at least an area of the optical surface 103 upon which the input optical beam 107 is incident. The reflecting system 113 is positioned on the angled optical surface 103 across the above-mentioned first direction, as indicated by the arrow representing the input optical beam 107, so that light propagating along the first direction through the end portion 102 is incident upon the reflecting system 113 at the angled optical surface 103. The reflecting system 113 functions to reflect the input optical beam 107 that is emitted from the core of the optical fiber 109 into a reflected beam 115 directed toward a use device 116, such as a photonic chip. In some embodiments, the reflecting system 113 can be formed as a multilayer stack of materials, such as a multilayer stack of films and/or coatings. The reflected beam 115 includes a first reflected beam 115A of a first polarization and a second reflected beam 115B of a second polarization. Therefore, the reflecting system 113 is configured to reflect incident light propagating along the above-mentioned first direction (as indicated by the arrow representing the input optical beam 107) into the first reflected beam 115A of the first polarization and the second reflected beam 115B of the second polarization. The first reflected beam 115A is separated from the second reflected beam 115B by a beam spacing 117. The beam spacing 117 is large enough to provide separation of the first reflected beam 115A and the second reflected beam 115B into respective optical communication channels of the use device 116. In other words, the first reflected beam 115A and the second reflected beam 115B are separated by the beam spacing 117 sized to direct the first reflected beam 115A into a first optical communication channel and to direct the second reflected beam 115B into a second optical communication channel. In some embodiments, the use device 116 is a photonic chip that includes optical input couplers separated by the beam spacing 117. It should also be understood that in some embodiments, the direction of travel of the reflected beam 115 and the input optical beam 107 can be reversed, such that the reversed version of the reflected beam 115 is reflected by the reflecting system 113 on the angled optical surface 103 into the core of the optical fiber 109. For example, in some embodiments, one or both of the first reflected beam 115A and the second reflected beam 115B is/are transmitted from the use device 116 through the end portion 102 of the beam steering structure 101 toward the reflecting system 113, and is/are reflected by the reflecting system 113 into the core of the optical fiber 109.

The alignment structure 111 can be formed integrally with the beam steering structure 101. The alignment structure 111 facilitates placement of a waveguide, such as the optical fiber 109, that defines the input optical beam 107. The beam steering structure 101 can be configured to receive multiple input optical beams 107. For example, in some embodiments, the beam steering structure 101 can be configured to receive an array of optical fibers 109. In some embodiments, the beam steering structure 101 can include a v-groove array that has multiple v-grooves oriented to extend parallel to each other, with each v-groove configured to receive one optical fiber 109. Also, in some embodiments, the waveguide that defines the input optical beam 107, e.g., the optical fiber 109, can optionally include an optical lensing element 106, such as a gradient index (GRIN) lens or graded-index optical fiber. And, in some embodiments, the optical lensing element 106 of the waveguide that defines the input optical beam 107 can cause the input optical beam 107 to converge as it enters the beam steering structure 101 and approaches the optical surface 103. In various embodiments, the optical lensing element 106 can be connected to the optical fiber 109 and/or the beam steering structure 101. The beam steering structure 101 includes a recessed region 114, with the end portion 102 positioned at an end of the recessed region 114, and with the alignment structure 111 positioned in the recessed region 114. The recessed region 114 has a recess height h1. The recess height h1 helps determine the vertical position of the beam waist with respect to the use device 116 and the clearance of the optical fiber 109 relative to the use device 116 or other elements of an optical package.

Figure 2:
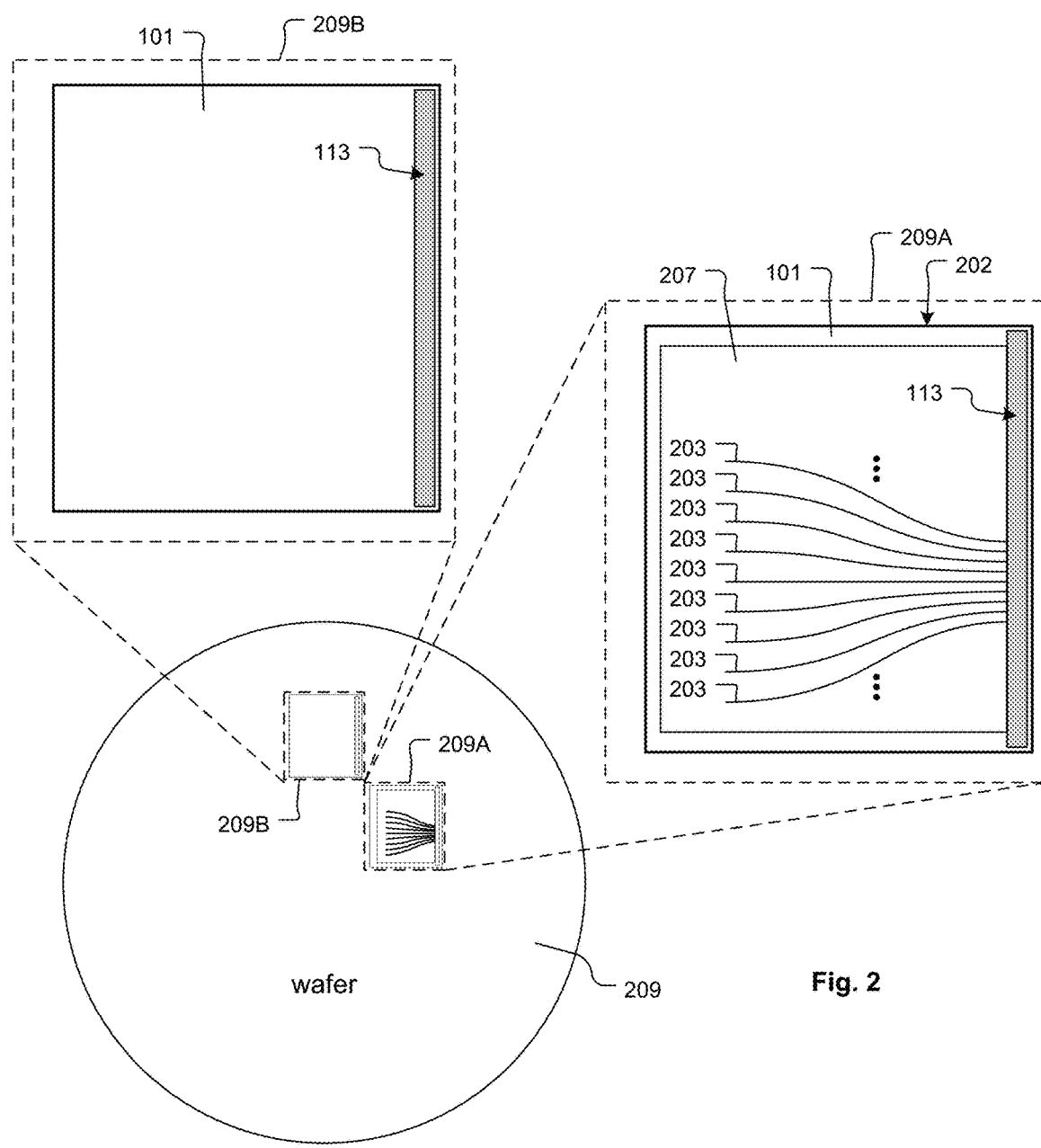
FIG. 2 shows a top schematic view of an integrated optical interface device that includes the beam steering structure (or another type of beam steering structure described herein) and a fan-out device integrated with the beam steering structure, in accordance with some embodiments.

In some embodiments, the beam steering structure 101 can be integrated with other devices, such as with other optical waveguide devices/structures and/or other optical components, within an integrated optical interface device. FIG. 2 shows a top schematic view of an integrated optical interface device 202 that includes the beam steering structure 101 (or another type of beam steering structure described herein) and a fan-out device 207 integrated with the beam steering structure 101, in accordance with some embodiments. The integrated optical interface device 202 is fabricated on a portion 209A of a substrate 209. The integrated optical interface device 202 can be one of many devices fabricated on the substrate 209. In some embodiments, at least some of the fabrication steps used to produce the many devices on the substrate 209 can be performed in parallel to provide scalable manufacturing. Also, in some embodiments, different configurations of integrated optical interface devices and/or beam steering structures can be fabricated on the same substrate 209. For example, FIG. 2 also shows another portion 209B of the substrate 209 where the beam steering structure 101 is fabricated as a stand-alone component. Therefore, it should be understood that in some embodiments a plurality of integrated optical interface devices and/or beam steering structures are fabricated in parallel (at the same time) on respective portions of a single substrate. In this manner, wafer fabrication processes are applied to simultaneously manufacture multiple instances of integrated optical interface devices and/or beam steering structures on a single substrate and thereby provide for scalable manufacturing.

As shown in FIG. 2, in some embodiments, the beam steering structure 101 (or other beam steering structure disclosed herein) can be integrated with the fan-out device 207. The fan-out device 207 includes optical waveguides 203 integrated/formed on the substrate 209. The optical waveguides 203 fan-out from one side of the fan-out device 207 near the reflecting system 113, where there is a smaller spacing between adjacent optical waveguides 203, to another side of the fan-out device 207 where there is a larger spacing between adjacent optical waveguides 203. The larger spacing between adjacent optical waveguides 203 can ease installation of optical fibers, such that the optical fibers direct respective beams of light into the optical waveguides 203 and/or receive respective beams of light from the optical waveguides 203. At the side of the fan-out device 207 where there is a smaller spacing between adjacent optical waveguides 203, the optical waveguides 203 can be fabricated to direct light onto the reflecting system 113. In some embodiments, the substrate 209 can be formed of silica or silicon, using standard fabrication processes. In some embodiments, the optical waveguides 203 can include a nitride or other optical material. In various embodiments, the optical waveguides 203 can be part of a planar lightwave circuit or part of an interposer device. In some embodiments, the angled surface on which the reflecting system 113 is formed can be made by grey-scale etching methods, among other methods. Also, in some embodiments, the optical waveguides 203 and/or the angled surface on which the reflecting system 113 is formed can be fabricated using optical lithography methods, such as those used in semiconductor fabrication processes. In some embodiments, the reflecting system 113 can include a polarization beam splitting coating, such as described with regard to FIG. 1. The fan-out device 207 can also be configured to include optical fiber alignment features. For example, the fan-out device 207 can be configured to include an array of v-grooves at the side of the fan-out device 207 where there is a larger spacing between adjacent optical waveguides 203. Each of the v-grooves in the array can be configured to receive an optical fiber and align the core of the optical fiber with a respective one of the optical waveguides 203.

Figure 3A:
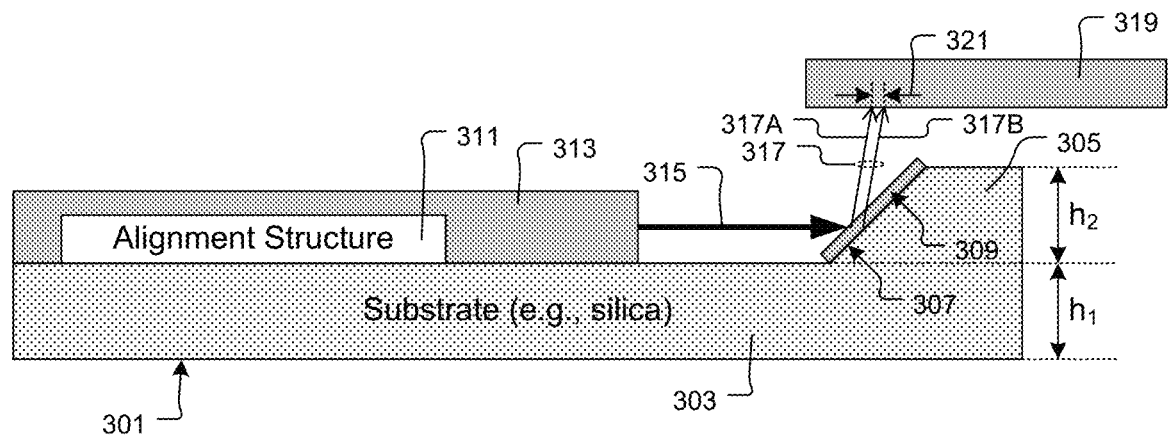
FIG. 3A shows a vertical cross-section view of a beam steering structure, in accordance with some embodiments.
Figure 3B:
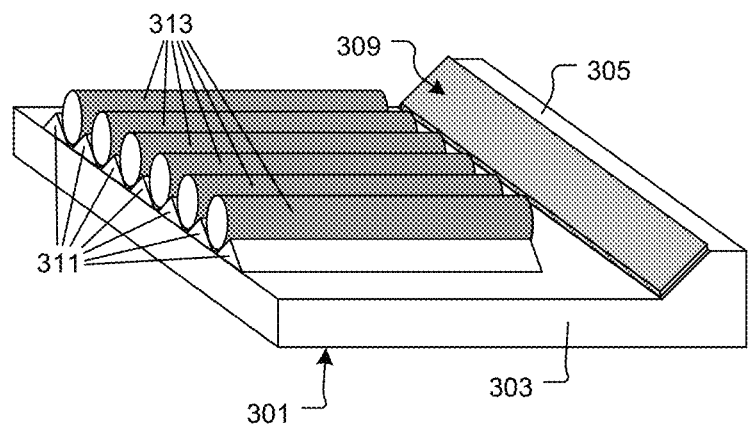
FIG. 3B shows an isometric view of the beam steering structure of FIG. 3A, in accordance with some embodiments.

FIG. 3A shows a vertical cross-section view of a beam steering structure 301, in accordance with some embodiments. FIG. 3B shows an isometric view of the beam steering structure 301, in accordance with some embodiments. The beam steering structure 301 includes a substrate 303 that can be formed of silica or silicon, among other materials, in various embodiments. The substrate 303 includes a beam steering section 305 that includes an angled surface 307. A reflecting system 309 is disposed on the angled surface 307 of the beam steering section 305. In some embodiments, the reflecting system 309 can be formed as a multilayer stack of materials, such as a multilayer stack of films and/or coatings. The substrate 303 includes an alignment structure 311 configured to receive and align a number of optical waveguides, such as optical fibers 313. The alignment structure 311 is configured to orient the optical fibers 313 (or other type of optical waveguide) so that an input optical beam 315 transmitted from the optical fiber 313 is directed toward the reflecting system 309 on the angled surface 307. The beam steering structure 301 includes the alignment structure 311 shaped to receive and align one or more optical fiber(s) such that an axis of a core of each of the optical fiber(s) is oriented in a first direction within the alignment structure 311, such that the input optical beam 315 propagates in the first direction. The beam steering section 305 is formed as an end portion of the beam steering structure 301. The beam steering section 305 has the angled optical surface 307 oriented at an angle relative to the above-mentioned first direction.

The reflecting system 309 is disposed on the angled surface 307 to extend over at least an area of the angled surface 307 upon which the input optical beam 315 is incident. The reflecting system 309 is positioned on the angled surface 307 across the above-mentioned first direction (the direction in which the input optical beam 315 propagates) so that light propagating along the first direction from the optical fiber 313 is incident upon the reflecting system 309. The reflecting system 309 functions to reflect the input optical beam 315 that is emitted from the core of the optical fiber 313 into a reflected beam 317 directed outward away from the substrate 303 and toward a use device 319, such as a photonic chip. The beam steering structure 301 is an outward-reflecting type of beam steering structure because it is configured to reflect the input optical beam 315 outward away from the substrate 303 without having the reflected beam 317 pass through the substrate 303. In some embodiments, the reflected beam 317 includes a first reflected beam 317A of a first polarization and a second reflected beam 317B of a second polarization. The first reflected beam 317A is separated from the second reflected beam 317B by a beam spacing 321. The beam spacing 321 is large enough to provide separation of the first reflected beam 317A and the second reflected beam 317B into respective optical channels of the use device 319.

Therefore, in some embodiments, the reflecting system 309 is configured to reflect incident light of the input optical beam 315 propagating along the first direction (as indicated by the arrow representing the input optical beam 315) into the first reflected beam 317A of the first polarization and the second reflected beam 317B of the second polarization. The first reflected beam 317A and the second reflected beam 317B are separated by the beam spacing 321 that is sized to direct the first reflected beam 317A into a first optical communication channel and to direct the second reflected beam 317B into a second optical communication channel. The beam steering section 305 (end portion) of the beam steering structure 301 is shaped and positioned so that the first reflected beam 317A and the second reflected beam 317B do not pass through the beam steering structure 301.

In some embodiments, the use device 319 is a photonic chip that includes optical input couplers separated by the beam spacing 319. It should also be understood that in some embodiments, the direction of travel of the reflected beam 317 and the input optical beam 315 can be reversed, such that the reversed version of the reflected beam 317 is reflected by the reflecting system 309 on the angled surface 307 into the core of the optical fiber 313. The thickness $h_1$ of substrate 303 can be consistent with robust manufacturability and the need to fit inside a surrounding package. The recess height $h_2$ helps determine the vertical position of the beam waist with respect to the use device 319 and the clearance of the optical fiber 313 relative to the use device 319 or other elements of an optical package.

Figure 4A:
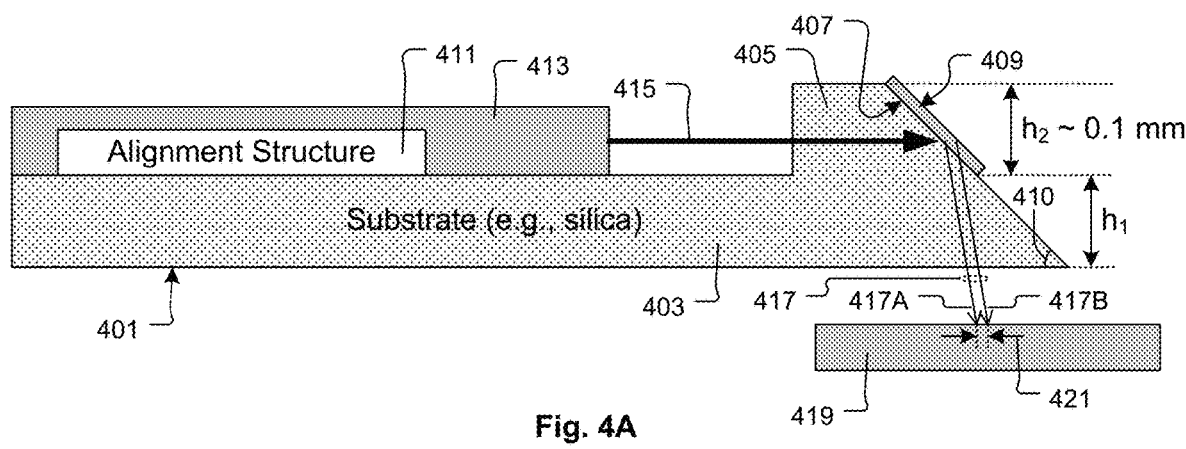
FIG. 4A shows a vertical cross-section view of a beam steering structure, in accordance with some embodiments.
Figure 4B:
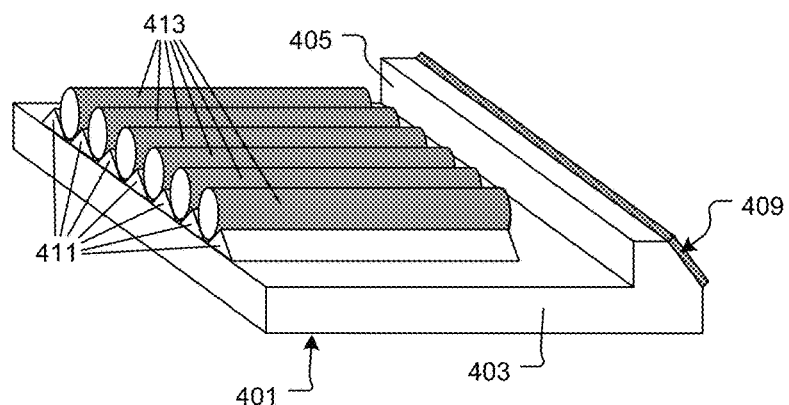
FIG. 4B shows an isometric view of the beam steering structure of FIG. 4A, in accordance with some embodiments.

FIG. 4A shows a vertical cross-section view of a beam steering structure 401, in accordance with some embodiments. FIG. 4B shows an isometric view of the beam steering structure 401, in accordance with some embodiments. The beam steering structure 401 includes a substrate 403 that can be formed of silica or silicon, among other materials, in various embodiments. The substrate 403 includes a beam steering section 405 that includes an angled surface 407. A reflecting system 409 is disposed on the angled surface 407 of the beam steering section 405. In some embodiments, the reflecting system 409 can be formed as a multilayer stack of materials, such as a multilayer stack of films and/or coatings. The substrate 403 includes alignment structures 411 configured to receive and align a number of optical waveguides, such as optical fibers 413. The alignment structures 411 are configured to orient the optical fibers 413 (or other type of optical waveguide) so that an input optical beam 415 transmitted from the optical fiber 413 is directed through the beam steering section 405 toward the reflecting system 409 on the angled surface 407.

The reflecting system 409 is disposed on the angled surface 407 to extend over at least an area of the angled surface 407 upon which the input optical beam 415 is incident. The reflecting system 409 functions to reflect the input optical beam 415 that is emitted from the core of the optical fiber 413 into a reflected beam 417 directed inward through the substrate 403 and toward a use device 419, such as a photonic chip. The beam steering structure 401 is an inward-reflecting type of beam steering structure because it is configured to reflect the input optical beam 415 inward through the substrate 403 and toward the use device 419. In some embodiments, the reflected beam 417 includes a first reflected beam 417A of a first polarization and a second reflected beam 417B of a second polarization. The first reflected beam 417A is separated from the second reflected beam 417B by a beam spacing 421. The beam spacing 421 is large enough to provide separation of the first reflected beam 417A and the second reflected beam 417B into respective optical channels of the use device 419. In some embodiments, the use device 419 is a photonic chip that includes optical input couplers separated by the beam spacing 421. It should also be understood that in some embodiments, the direction of travel of the reflected beam 417 and the input optical beam 415 can be reversed, such that the reversed version of the reflected beam 417 is reflected by the reflecting system 409 on the angled surface 407 into the core of the optical fiber 413. The thickness $h_1$ of substrate 403 can be consistent with robust manufacturability and the need to fit inside a surrounding package. The recess height $h_2$ helps determine the vertical position of the beam waist with respect to the use device 419 and the clearance of the optical fiber 413 relative to the use device 419 or other elements of an optical package.

For both the outward-reflecting type of beam steering structure 301 and the inward-reflecting type of beam steering structure 401, it may be advantageous to have the alignment structures 311, 411 open either toward or away from the use device 319, 419. The decision to have the alignment structures 311, 411 open either toward or away from the use device 319, 419 can be based on packaging considerations such as clearance, thermal management, and/or other considerations. For example, the inward-reflecting type of beam steering structure 401 is configured to have the alignment structures 411 open away from the use device 419. In contrast, the beam steering structure 101 of FIG. 1 shows another inward-reflecting type of beam steering structure configured to have the alignments structures 111 open toward the use device 116.

It should be understood that fabrication of the reflecting system 309 for the outward-reflecting type of beam steering structure 301 differs from fabrication of the reflecting system 409 for the inward-reflecting type of beam steering structure 401. Specifically, for the outward-reflecting type of beam steering structure 301, a first reflecting region of the reflecting system 309 that is initially encountered by the input optical beam 315 is deposited/formed after (and possibly on top of) a second reflecting region of the reflecting system 309, where the first reflecting region of the reflecting system 309 is defined to reflect the first reflected beam 317A, and the second reflecting region of the reflecting system 309 is defined to reflect the second reflected beam 317B.

For the inward-reflecting type of beam steering structure 101, 401, a first reflecting region of the reflecting system 113, 409 is deposited/formed first followed by deposition/formation of a second reflecting region of the reflecting system 113, 409, where the first reflecting region of the reflecting system 113, 409 is defined to reflect the first reflected beam 115A, 417A, and the second reflecting region of the reflecting system 113, 409 is defined to reflect the second reflected beam 115B, 417B. The fabrication of the reflecting system 113, 309, 409 considers material choice, layer adhesion, and flatness, among other issues. These issues associated with fabrication of the reflecting system 113, 309, 409 can be a consideration in determining whether or not to implement the outward-reflecting type of beam steering structure 301 or the inward-reflecting type of beam steering structure 101, 401.

Figure 5:
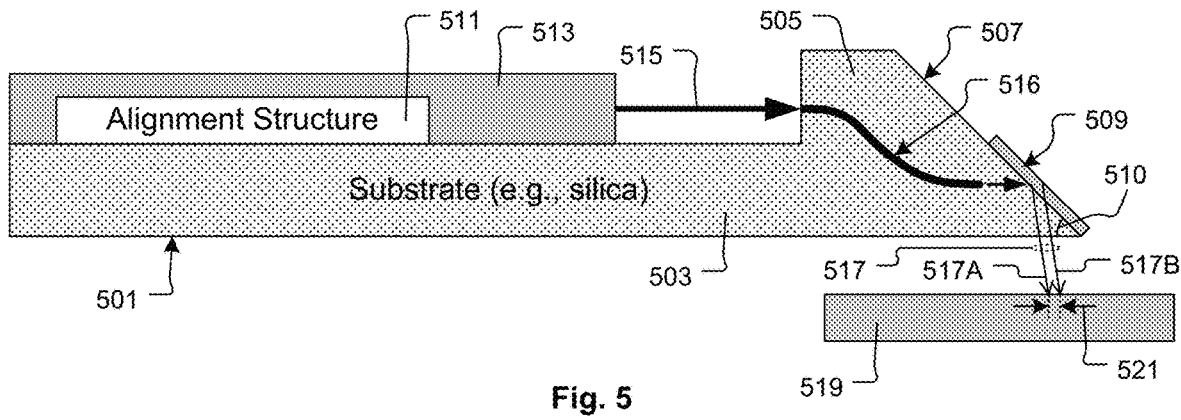
FIG. 5 shows a vertical cross-section view of a beam steering structure, in accordance with some embodiments.

FIG. 5 shows a vertical cross-section view of a beam steering structure 501, in accordance with some embodiments. The beam steering structure 501 includes a substrate 503 that can be formed of silica or silicon, among other materials, in various embodiments. The substrate 503 includes a beam steering section 505 that includes an angled surface 507. A reflecting system 509 is disposed on the angled surface 507 of the beam steering section 505. In some embodiments, the reflecting system 509 can be formed as a multilayer stack of materials, such as a multilayer stack of films and/or coatings. The substrate 503 includes alignment structures 511 configured to receive and align a number of optical waveguides, such as optical fibers 513. The alignment structures 511 are configured to orient the optical fibers 513 (or other type of optical waveguide) so that an input optical beam 515 transmitted from the optical fiber 513 is directed to an input end of an intermediate optical waveguide 516. The intermediate optical waveguide 516 is configured to extend through the beam steering section 505 so that an output end of the intermediate optical waveguide 516 is positioned and oriented to direct the input optical beam 515 toward the reflecting system 509 on the angled surface 507. In this manner, the intermediate optical waveguide 516 is configured to couple light emitted from an input optical waveguide, e.g., optical fiber 513, to an input optical beam incident on the reflecting system 509 on the angled surface 507.

The reflecting system 509 is disposed on the angled surface 507 to extend over at least an area of the angled surface 507 upon which the input optical beam 515 that is emitted from the intermediate optical waveguide 516 is incident. The reflecting system 509 functions to reflect the input optical beam 515 that is emitted from the intermediate optical waveguide 516 into a reflected beam 517 directed inward through the substrate 503 and toward a use device 519, such as a photonic chip. The beam steering structure 501 is an inward-reflecting type of beam steering structure because it is configured to reflect the input optical beam 515 inward through the substrate 503 and toward the use device 519. In some embodiments, the reflected beam 517 includes a first reflected beam 517A of a first polarization and a second reflected beam 517B of a second polarization. The first reflected beam 517A is separated from the second reflected beam 517B by a beam spacing 521. The beam spacing 521 is large enough to provide separation of the first reflected beam 517A and the second reflected beam 517B into respective optical channels of the use device 519. In some embodiments, the use device 519 is a photonic chip that includes optical input couplers separated by the beam spacing 521. It should also be understood that in some embodiments, the direction of travel of the reflected beam 517 and the input optical beam 515 can be reversed, such that the reversed version of the reflected beam 517 is reflected by the reflecting system 509 on the angled surface 507 into the intermediate optical waveguide 516 and from the intermediate optical waveguide 516 into the core of the optical fiber 513.

Figure 6:
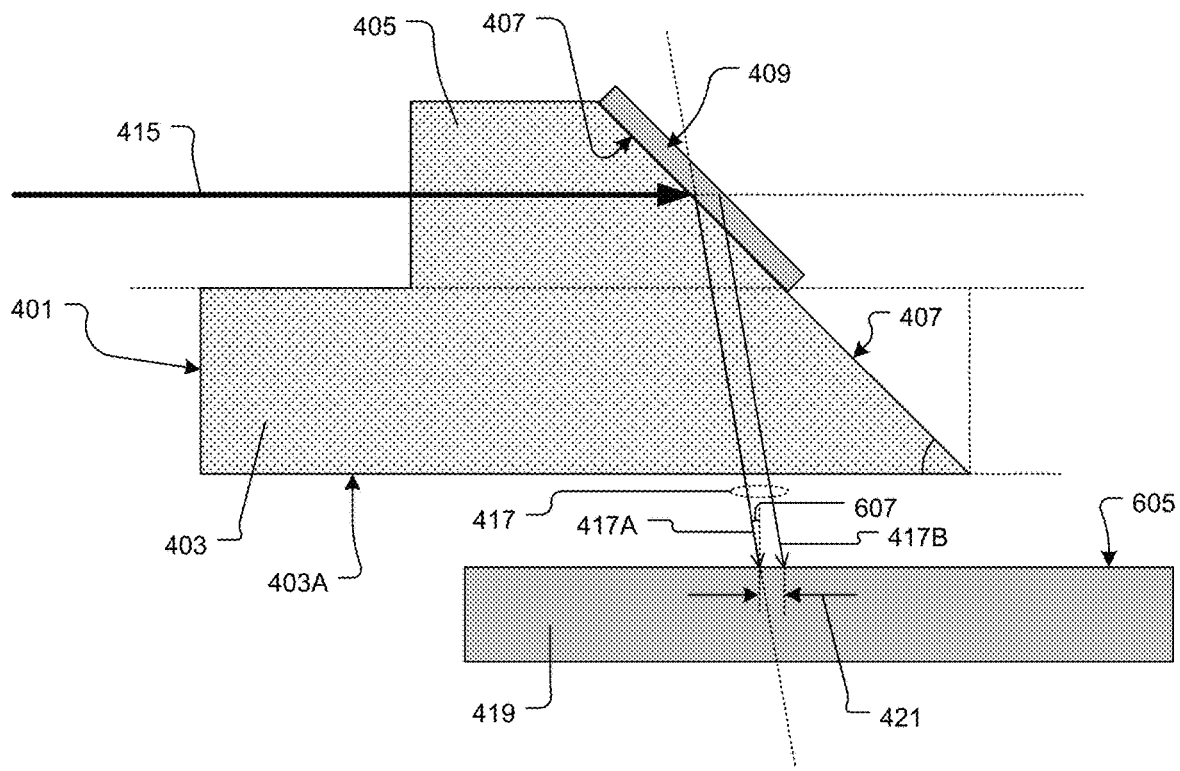
FIG. 6 shows a vertical cross-section through the beam steering section of the beam steering structure of FIG. 4A, in accordance with some embodiments.

FIG. 6 shows a vertical cross-section through the beam steering section 405 of the beam steering structure 401, in accordance with some embodiments. The beam steering section 405 is configured so that the input optical beam 415 is oriented substantially parallel to a surface of optical incidence 605 on the use device 419. Also, in FIG. 6, the input optical beam 415 is oriented parallel to a base of the beam steering section 405, i.e., to a bottom surface 403A of the substrate 403 of the beam steering section 405.

Figure 7:
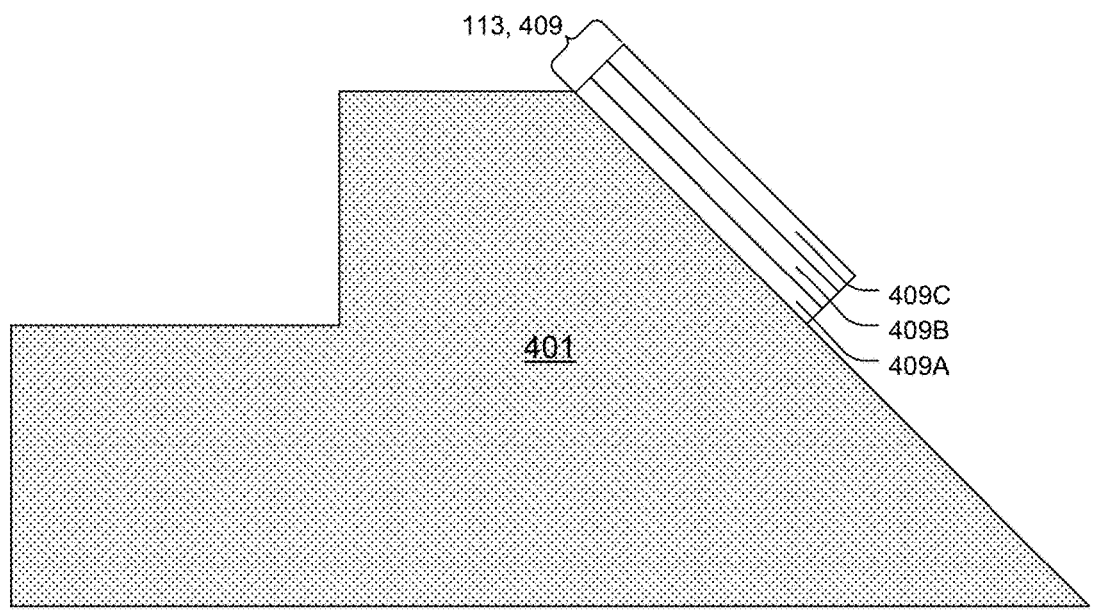
FIG. 7 shows a vertical cross-section through the reflecting system, in accordance with some embodiments.

FIG. 7 shows a vertical cross-section through the reflecting system 113, 409, in accordance with some embodiments. The reflecting system 113, 409 includes a first reflecting region 409A, a spacer region 409B, and a second reflecting region 409C. In various embodiments, each of the first reflecting region 409A, the spacer region 409B, and the second reflecting region 409C can include one or multiple layers of material. In some embodiments, the reflecting system 113, 409 is formed as a multilayer stack of materials that includes one or more layers of material in the first reflecting region 409A, one or more layers of material in the spacer region 409B, and one or more layers of material in the second reflecting region 409C, where the spacer region 409B is disposed between the first reflecting region 409A and the second reflecting region 409C.

Strong polarization dependence of the first reflecting region 409A of the reflecting system 113, 409 relies on the Brewster condition relating the incident angle between the input optical beam 107, 415 and the first reflecting region 409A and index values of the materials of the beam steering section 101, 405 and the first reflecting region 409A. With regard to the example of FIG. 1, the angle between the input optical beam 107 and the surface of optical incidence on the use device 116, and the angle between the angled surface 103 and the surface of optical incidence on the use device 116, can be defined in accordance with requirements of the optical grating couplers on the use device 116 into which the first reflected beam 115A and the second reflected beam 115B are directed, and can be defined to ease mechanical fabrication, and/or with consideration of other issues. After setting the angle between the input optical beam 107 and the surface of optical incidence on the use device 116, and the angle between the angled surface 103 and the surface of optical incidence on the use device 116, the material index of the first reflecting region 409A is selected as indicated by the Brewster condition.

Similarly, with regard to the example of FIG. 4A, the angle between the input optical beam 415 and the surface of optical incidence on the use device 419, and the angle between the angled surface 407 and the surface of optical incidence on the use device 419, can be defined in accordance with requirements of the optical grating couplers on the use device 419 into which the first reflected beam 417A and the second reflected beam 417B are directed, and can be defined to ease mechanical fabrication, and/or with consideration of other issues. After setting the angle between the input optical beam 415 and the surface of optical incidence on the use device 419, and the angle between the angled surface 407 and the surface of optical incidence on the use device 419, the material index of the first reflecting region 409A is selected as indicated by the Brewster condition.

In some embodiments, the first reflecting region 409A, or a first reflecting region material therein, is formed of a specific material mixture to achieve a material optical index value that optimizes the polarization selectivity. For example, in some embodiments, the first reflecting region 409A, or a first reflecting region material therein, can be formed of a silicon oxynitride $SiO_xN_y$ material, where the parameters (x, y) are selected to achieve a material optical index value required by the Brewster condition. In an example embodiment, the first reflecting region 409A, or a first reflecting region material therein, can be formed of a material that has a material optical index value ($n_{hi}$) of about 1.86. In some embodiments, the first reflecting region 409A, or a first reflecting region material therein, is formed of a more standard optical coating material, which may provide advantages of reduced cost, improved consistency, improved reliability, among other advantages. In these embodiments, it may not be possible to customize the optical index value of the optical coating material. Therefore, in these embodiments, with regard to the example of FIG. 1, the angle between the input optical beam 107 and the surface of optical incidence on the use device 116, and the angle between the angled surface 103 and the surface of optical incidence on the use device 116 can be controlled to achieve the Brewster condition. Similarly, in these embodiments, with regard to the example of FIG. 4A, the angle between the input optical beam 415 and the surface of optical incidence on the use device 419, and the angle between the angled surface 407 and the surface of optical incidence on the use device 419, can be controlled to achieve the Brewster condition.

Some example optical coating materials that have a low optical material index value (n<1.6) include $SiO_2$, $MgF_2$, and $CeF_3$, among others. Some example optical coating materials that have an intermediate optical material index value (1.6<=n<=1.8) include SiO, $Al_2O_3$, and $Y_2O_3$, among others. Some example optical coating materials that have a high optical material index value (n>1.8) include $HfO_2$, $Ta_2O_5$, $Nb_2O_5$, $LaTiO_3$, $TiO_2$, among others. Also, some semiconductor materials of higher material optical index value include InP, Si, GaAs, among others. Also, in some embodiments, polymers can be used as the optical coating materials, such as Poly(1,1,1,3,3,3-hexafluoroisopropyl acrylate) that has a material optical index value (n=1.375) to Poly(pentabromophenyl methacrylate) that has a material optical index value (n=1.71), among others. In some embodiments, the optical coating material is also selected based on resistance to high temperatures and resistance to scratching, among other considerations.

In FIG. 6, the input optical beam 415 is depicted as horizontal and parallel to both the bottom surface 403A of the substrate 403 of the beam steering section 405 and the horizontal plane of the use device 419, i.e., the surface of optical incidence 605 on the use device 419. Therefore, in the configuration of FIG. 6, the angle of the angled surface 407 as measured relative to the bottom surface 403A of the substrate 403 controls a chip incidence angle 607 of the reflected beam 417. The chip incidence angle 607 of the reflected beam 417 is measured between the direction of the reflected beam 417 and a vector perpendicular to the surface of optical incidence 605 on the use device 419 and within a reference plane that is coincident with the direction of the input optical beam 415 and perpendicular to the surface of optical incidence 605 on the use device 419.

In some embodiments, the beam steering structure 401 can be tilted with respect to the surface of optical incidence 605 on the use device 419. For example, in some embodiments, an active alignment process can be performed when positioning the beam steering structure 401 relative to the use device 419 to actively determine when first reflected beam 417A and the second reflected beam 417B are properly directed toward respective optical grating couplers on the use device 419. In the active alignment process, light is transmitted through the beam steering structure 401 as it is positioned relative to the use device 419, and the light received by the optical grating couplers on the use device 419 is monitored to determine when the first reflected beam 417A and the second reflected beam 417B are properly directed toward respective optical grating couplers on the use device 419. Once proper alignment between the beam steering structure 401 and the use device 419 is achieved, the beam steering structure 401 can be fixed in position relative to the use device 419 by depositing an epoxy or similar adhesive between the beam steering structure 401 and the use device 419.

Figure 8:
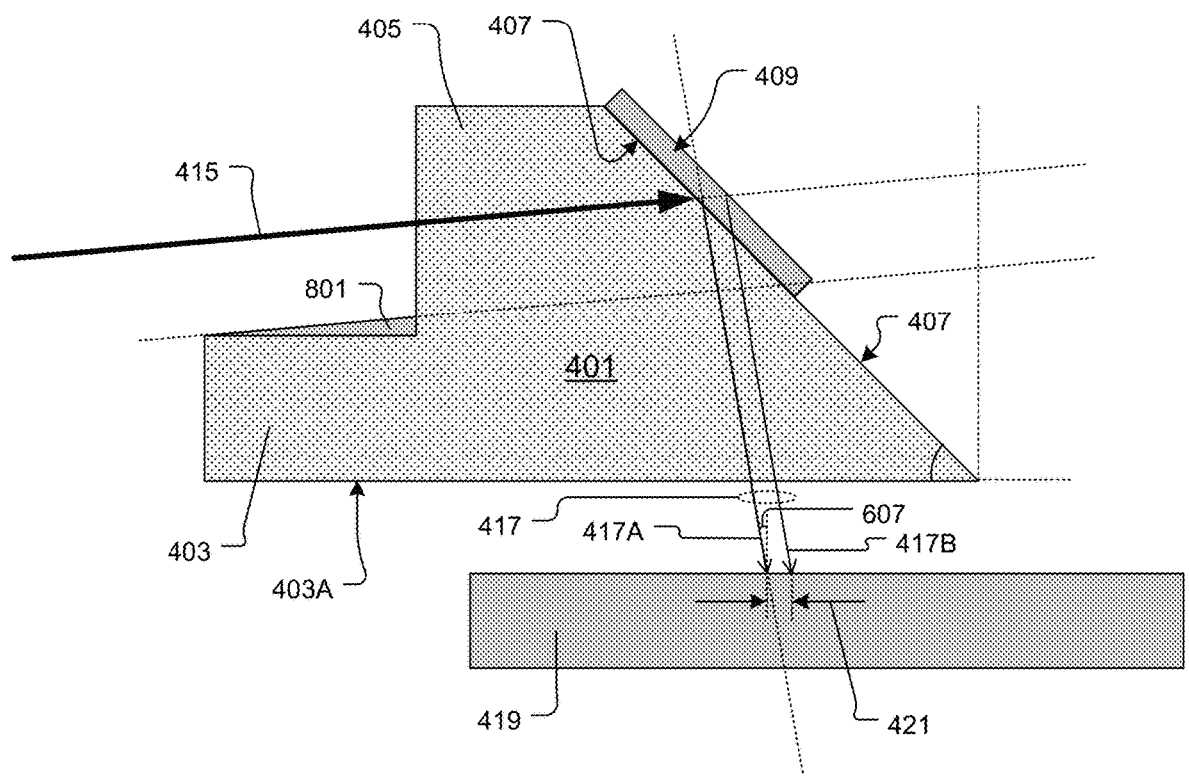
FIG. 8 shows a vertical cross-section through a beam steering section that is a variation of the beam steering section as shown in FIG. 6, in accordance with some embodiments.

FIG. 8 shows a vertical cross-section through a beam steering section 405A that is a variation of the beam steering section 405 as shown in FIG. 6, in accordance with some embodiments. The beam steering section 405A includes a ramp structure 801 configured to control an inclination angle 803 of the input optical beam 415 relative to the base of the beam steering section 405A, i.e., to the bottom surface 403A of the substrate 403 of the beam steering section 405A. In some embodiments, such as shown in FIG. 8, the ramp structure 801 can be configured to incline the input optical beam 415 upward away from the base of the beam steering section 405A. And, in some embodiments, the ramp structure 801 can be configured to incline the input optical beam 415 downward toward the base of the beam steering section 405A. In the embodiment of FIG. 8, when the bottom surface 403A of the substrate 403 of the beam steering section 405A is positioned parallel with the surface of optical incidence 605 on the use device 419, the inclination angle 803 will control the angle between the input optical beam 415 and the surface of optical incidence 605 on the use device 419. Therefore, in the embodiments of FIG. 8, the inclination angle 803 and the angle between the angled surface 407 and the surface of optical incidence 605 on the use device 419, can be defined in accordance with requirements of the optical grating couplers on the use device 419 into which the first reflected beam 417A and the second reflected beam 417B are directed, and can be defined to ease mechanical fabrication, and/or with consideration of other issues.

Figure 9:
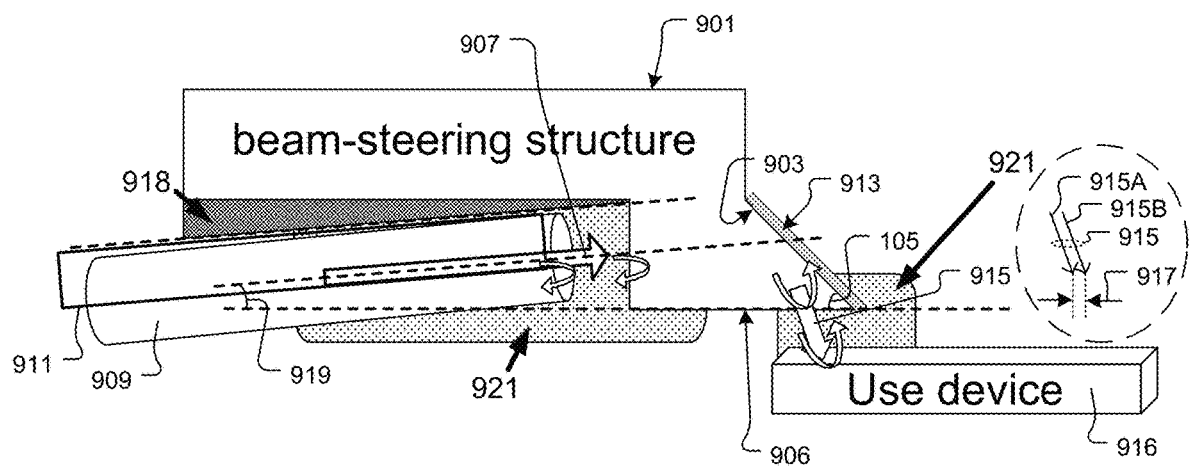
FIG. 9 shows a vertical cross-section view of a beam steering structure, in accordance with some embodiments.

FIG. 9 shows a vertical cross-section view of a beam steering structure 901, in accordance with some embodiments. The beam steering structure 901 includes an angled optical surface 903 angled at a surface angle 905 measured relative to a bottom surface 906 of a base of the beam steering structure 901. In some embodiments, the beam steering structure 901 can include an alignment structure 911, such as a v-groove, into which an optical fiber 909 is positioned. A reflecting system 913 is disposed on the angled optical surface 903 to extend over at least an area of the angled optical surface 903 upon which an input optical beam 907 is incident. In some embodiments, the reflecting system 913 can be formed as a multilayer stack of materials, such as a multilayer stack of films and/or coatings. The reflecting system 913 functions to reflect the input optical beam 907 that is emitted from the core of the optical fiber 909 into a reflected beam 915 directed toward a use device 916, such as a photonic chip. The reflected beam 915 can include a first reflected beam 915A of a first polarization and a second reflected beam 915B of a second polarization. The first reflected beam 915A is separated from the second reflected beam 915B by a beam spacing 917. The beam spacing 917 is large enough to provide separation of the first reflected beam 915A and the second reflected beam 915B into respective optical channels of the use device 916. In some embodiments, the use device 916 is a photonic chip that includes optical input couplers separated by the beam spacing 917. It should also be understood that in some embodiments, the direction of travel of the reflected beam 915 and the input optical beam 907 can be reversed, such that the reversed version of the reflected beam 915 is reflected by the reflecting system 913 on the angled optical surface 903 into the core of the optical fiber 909.

In some embodiments, the alignment structure 911 can be formed integrally with the beam steering structure 901. The alignment structure 911 facilitates placement of a waveguide, such as the optical fiber 909, that defines the input optical beam 907. The beam steering structure 901 can be configured to receive multiple input optical beams 907. For example, in some embodiments, the beam steering structure 901 can be configured to receive an array of optical fibers 909. In some embodiments, the alignment structure 911 of the beam steering structure 901 can include a v-groove array that has multiple v-grooves oriented to extend parallel to each other, with each v-groove configured to receive one optical fiber 909. Also, in some embodiments, the waveguide that defines the input optical beam 907, e.g., the optical fiber 909, can include an optical lensing element, such as a GRIN lens or graded-index optical fiber. And, in some embodiments, the optical lensing element of the waveguide that defines the input optical beam 907 can cause the input optical beam 907 to converge as it enters the beam steering structure 901 and approaches the optical surface 903.

The beam steering structure 901 also includes a ramp structure 918 configured to oriented the waveguide that defines the input optical beam 907, e.g., the optical fiber 909, at an angle 919 relative to the bottom surface 906 of the base of the beam steering structure 901. In some embodiments, the alignment structure 911 is formed integrally with ramp structure 918. In some embodiments, the ramp structure 918 is formed integrally with the beam steering structure 901. In some embodiments, the ramp structure 918 and the beam steering structure 901 are physically separate structures, with the ramp structure 918 configured for installation on the beam steering structure 901. In some embodiments, the angle 919 defines an angle between a direction of travel of the input optical beam 907 and the bottom surface 906 of the base of the beam steering structure 901. The beam steering structure 901 and the ramp structure 918 can be defined so that the input optical beam 907 is incident upon the beam steering structure 901 at a non-perpendicular angle of incidence so as to mitigate reflection of the input optical beam 907 back into the waveguide, e.g., back into the core of the optical fiber 909. Also, in some embodiments, a fill material 921 is used to secure the beam steering structure 901, the optical fiber 909, and the use device 916 in a fixed spatial orientation with respect to each other. In various embodiments, the fill material 921 can have a material optical index value similar to the core of the optical fiber 909 and/or the beam steering structure 901. In some embodiments, the fill material 921 is an optical-grade epoxy. In some embodiments, the fill material 921 is a glass material having a low melting temperature.

It may be of interest to avoid back-reflections of the input optical beam 907 that direct light back into the core of the optical fiber 909. Such back-reflections can lead to signal impairments (such as spectral interference and fading) and can possibly damage the optical source operating to generate the input optical beam 907. In some embodiments, the fill material 921 is an optical index-matched material that has an optical index value substantially equal to the optical index value of either the beam-steering structure 901 and/or the core of the optical fiber 909. Optical reflections of the input optical beam 907 are minimized at surfaces of the core of the optical fiber 909 and the beam steering structure 901 when the core of the optical fiber 909, the fill material 921, and the beam steering structure 901 have substantially the same optical index value. In some embodiments, an example common optical index value for the core of the optical fiber 909, the fill material 921, and the beam steering structure 901 is 1.45. However, it should be understood that in other embodiments, the optical index value for the core of the optical fiber 909, the fill material 921, and the beam steering structure 901 can be either less than 1.45 or greater than 1.45.

In some embodiments, the angle of the incident light on each interface within the beam steering structure 901 can be large enough to reduce capture of back-reflected light by the core of the optical fiber 909. The ramp structure 918 can be configured to ensure that the angle of the incident light on each interface within the beam steering structure 901 is large enough to reduce capture of back-reflected light by the core of the optical fiber 909. In some embodiments, the beam steering structure 901 can include additional angled interfaces to assist with preventing capture of back-reflected light by the core of the optical fiber 909. For example, in some embodiments, the facet of the beam steering structure 901, where the input optical beam 907 is incident upon the beam steering structure 901, can be formed at an angle to reduce/prevent capture of back-reflected light by the core of the optical fiber 909.

In some embodiments, the beam steering structure 901 can be actively aligned with the use device 916, so that the first reflected beam 915A and the second reflected beam 915B are actively detected at respective optical grating couplers on the use device 916 before application of the fill material 921, while maintaining low light loss as the fill material 921 (optical index-matched) is applied and cured. In some embodiments, the active alignment of the beam steering structure 901 with the use device 916 is performed in an inward-reflecting version of the beam steering structure 901 where the bottom surface 906 of a base of the beam steering structure 901 is substantially parallel to the optical incidence plane of the use device 916.

Figure 10:
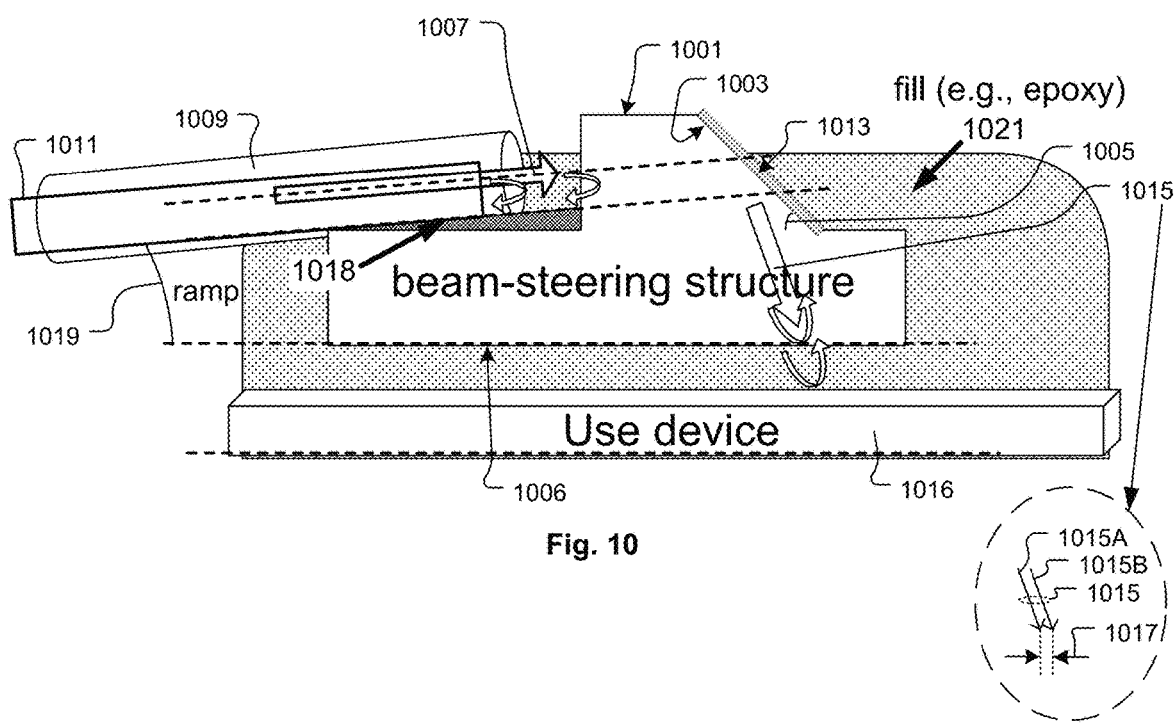
FIG. 10 shows a vertical cross-section view of a beam steering structure having a base, in accordance with some embodiments.

FIG. 10 shows a vertical cross-section view of a beam steering structure 1001 having a base, in accordance with some embodiments. The beam steering structure 1001 of FIG. 10 is similar to the beam steering structure 901 of FIG. 9, except that an alignment structure 1011 and a ramp structure 1018 are position above a base of the beam steering structure 1001. The beam steering structure 1001 includes an angled optical surface 1003 angled at a surface angle 1005 measured relative to a bottom surface 1006 of a base of the beam steering structure 1001. In some embodiments, the beam steering structure 1001 can include an alignment structure 1011, such as a v-groove, into which an optical fiber 1009 is positioned. A reflecting system 1013 is disposed on the angled optical surface 1003 to extend over at least an area of the angled optical surface 1003 upon which an input optical beam 1007 is incident. In some embodiments, the reflecting system 1013 can be formed as a multilayer stack of materials, such as a multilayer stack of films and/or coatings. The reflecting system 1013 functions to reflect the input optical beam 1007 that is emitted from the core of the optical fiber 1009 into a reflected beam 1015 directed toward a use device 1016, such as a photonic chip.

The reflected beam 1015 can include a first reflected beam 1015A of a first polarization and a second reflected beam 1015B of a second polarization. The first reflected beam 1015A is separated from the second reflected beam 1015B by a beam spacing 1017. The beam spacing 1017 is large enough to provide separation of the first reflected beam 1015A and the second reflected beam 1015B into respective optical channels of the use device 1016. In some embodiments, the use device 1016 is a photonic chip that includes optical input couplers separated by the beam spacing 1017. It should also be understood that in some embodiments, the direction of travel of the reflected beam 1015 and the input optical beam 1007 can be reversed, such that the reversed version of the reflected beam 1015 is reflected by the reflecting system 1013 on the angled optical surface 1003 into the core of the optical fiber 1009.

As with the alignment structure 911, the alignment structure 1011 facilitates placement of a waveguide, such as the optical fiber 1009, that defines the input optical beam 1007. Also, in some embodiments, as with the alignment structure 911, the alignment structure 1011 can be configured as a v-groove array that has multiple v-grooves oriented to extend parallel to each other, with each v-groove configured to receive one optical fiber 1009. And, similar to the ramp structure 918, the ramp structure 1018 is configured to oriented the waveguide that defines the input optical beam 1007, e.g., the optical fiber 1009, at an angle 1019 relative to the bottom surface 1006 of the base of the beam steering structure 1001. In some embodiments, the alignment structure 1011 is formed integrally with ramp structure 1018. In some embodiments, the ramp structure 1018 is formed integrally with the beam steering structure 1001. In some embodiments, the ramp structure 1018 and the beam steering structure 1001 are physically separate structures, with the ramp structure 1018 configured for installation on the beam steering structure 1001. In some embodiments, the angle 1019 defines an angle between a direction of travel of the input optical beam 1007 and the bottom surface 1006 of the base of the beam steering structure 1001. The beam steering structure 1001 and the ramp structure 1018 can be defined so that the input optical beam 1007 is incident upon the beam steering structure 1001 at a non-perpendicular angle of incidence so as to mitigate reflection of the input optical beam 1007 back into the waveguide, e.g., back into the core of the optical fiber 1009. Also, in some embodiments, a fill material 1021 is used to secure the beam steering structure 1001, the optical fiber 1009, and the use device 1016 in a fixed spatial orientation with respect to each other. In various embodiments, the fill material 1021 can have a material optical index value similar to the core of the optical fiber 1009 and/or the beam steering structure 1001. In some embodiments, the fill material 1021 is an optical-grade epoxy. In some embodiments, the fill material 1021 is a glass material having a low melting temperature.

It may be of interest to avoid back-reflections of the input optical beam 1007 that direct light back into the core of the optical fiber 1009. Such back-reflections can lead to signal impairments (such as spectral interference and fading) and can possibly damage the optical source operating to generate the input optical beam 1007. In some embodiments, the fill material 1021 is an optical index-matched material that has an optical index value substantially equal to the optical index value of either the beam-steering structure 1001 and/or the core of the optical fiber 1009. Optical reflections of the input optical beam 1007 are minimized at surfaces of the core of the optical fiber 1009 and the beam steering structure 1001 when the core of the optical fiber 1009, the fill material 1021, and the beam steering structure 1001 have substantially the same optical index value. In some embodiments, an example common optical index value for the core of the optical fiber 1009, the fill material 1021, and the beam steering structure 1001 is 1.45. However, it should be understood that in other embodiments, the optical index value for the core of the optical fiber 1009, the fill material 1021, and the beam steering structure 1001 can be either less than 1.45 or greater than 1.45.

The angle of the incident light on each material interface within the beam steering structure 1001 can be large enough to reduce capture of back-reflected light by the core of the optical fiber 1009. The ramp structure 1018 can be configured to ensure that the angle of the incident light on each material interface within the beam steering structure 1001 is large enough to reduce capture of back-reflected light by the core of the optical fiber 1009. In some embodiments, the beam steering structure 1001 can include additional angled material interfaces to assist with preventing capture of back-reflected light by the core of the optical fiber 1009. For example, in some embodiments, the facet of the beam steering structure 1001, where the input optical beam 1007 is incident upon the beam steering structure 1001, can be formed at an angle to reduce/prevent capture of back-reflected light by the core of the optical fiber 1009.

In some embodiments, the beam steering structure 1001 can be actively aligned with the use device 1016, so that the first reflected beam 1015A and the second reflected beam 1015B are actively detected at respective optical grating couplers on the use device 1016, before application of the fill material 1021, while maintaining low light loss as the fill material 1021 (optical index-matched) is applied and cured. In some embodiments, the active alignment of the beam steering structure 1001 with the use device 1016 is performed in an inward-reflecting version of the beam steering structure 1001 where the bottom surface 1006 of a base of the beam steering structure 1001 is substantially parallel to the optical incidence plane of the use device 1016.

Figure 11A:
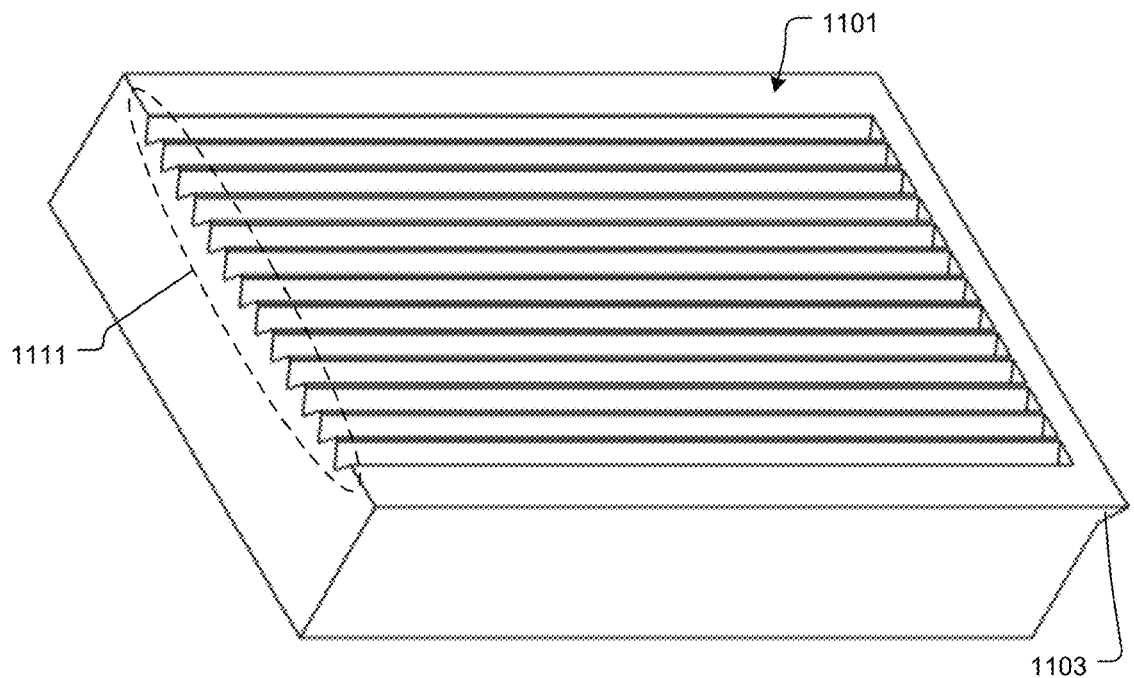
FIG. 11A shows an isometric view of a beam steering structure, in accordance with some embodiments.
Figure 11B:
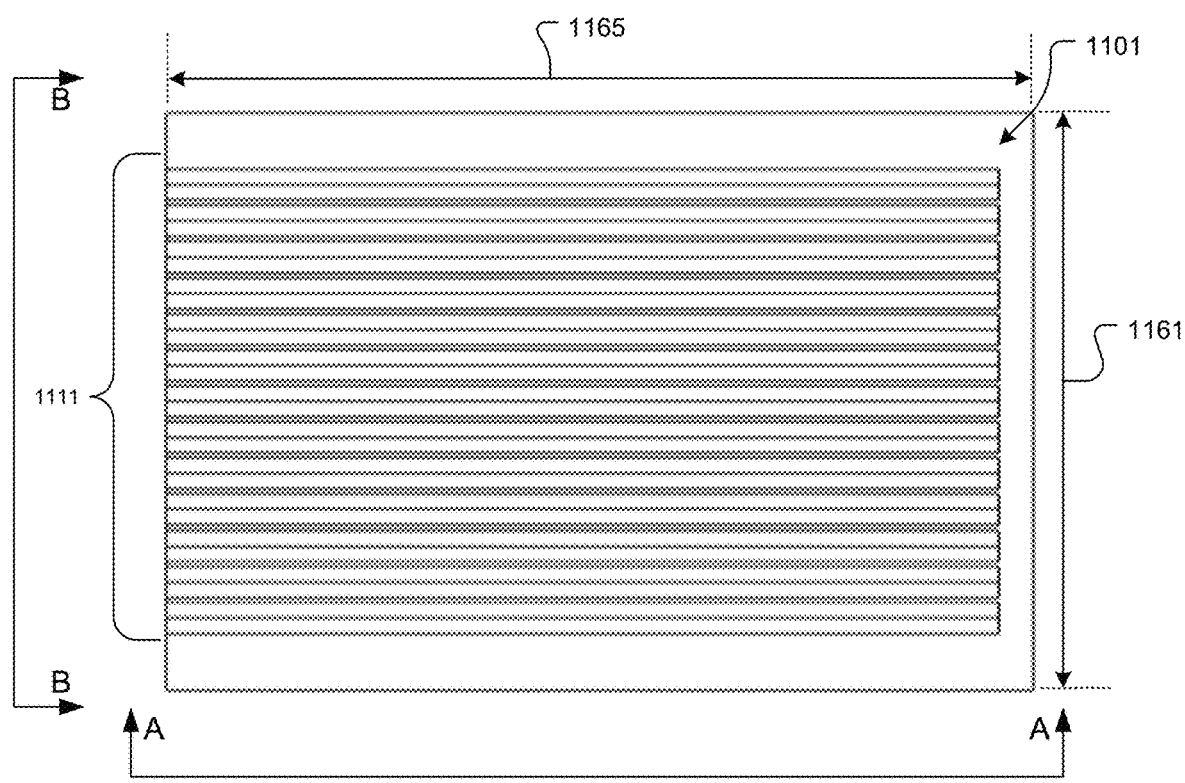
FIG. 11B shows a top view of the beam steering structure of FIG. 11A, in accordance with some embodiments.
Figure 11C:
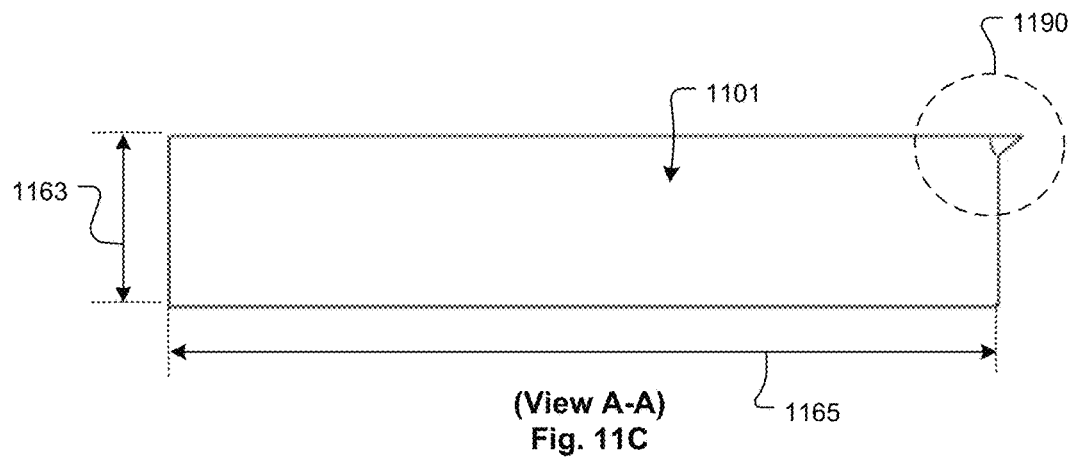
FIG. 11C shows a side view of the beam steering structure, corresponding to view A-A as referenced in FIG. 11B, in accordance with some embodiments.
Figure 11D:
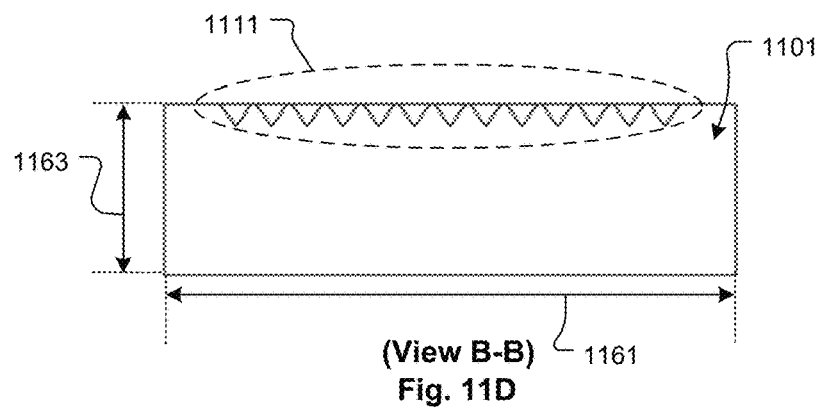
FIG. 11D shows an end view of the beam steering structure, corresponding to view B-B as referenced in FIG. 11B, in accordance with some embodiments.

FIG. 11A shows an isometric view of a beam steering structure 1101, in accordance with some embodiments. FIG. 11B shows a top view of the beam steering structure 1101, in accordance with some embodiments. FIG. 11C shows a side view of the beam steering structure 1101, corresponding to view A-A as referenced in FIG. 11B, in accordance with some embodiments. FIG. 11D shows an end view of the beam steering structure 1101, corresponding to view B-B as referenced in FIG. 11B, in accordance with some embodiments. FIG. 11G shows a close-up view of the area 1190 as referenced in FIG. 11C, in accordance with some embodiments.

The beam steering structure 1101 includes an angled optical surface 1103 angled at a surface angle 1105 measured relative to a top surface 1106 of the beam steering structure 1101. In some embodiments, the surface angle 1105 is about 39.6 degrees. However, in other embodiments, the surface angle 1105 can be either less than 39.6 degrees or greater than 39.6 degrees. In some embodiments, the beam steering structure 1101 is formed to have a width 1161 of about 4 millimeters (mm). However, in other embodiments, the width 1161 can be either less than 4 mm or greater than 4 mm. In some embodiments, the beam steering structure 1101 is formed to have a height 1163 of about 1.2 mm. However, in other embodiments, the height 1163 can be either less than 1.2 mm or greater than 1.2 mm. In some embodiments, the beam steering structure 1101 is formed to have a length 1165 of about 6 mm. However, in other embodiments, the length 1165 can be either less than 6 mm or greater than 6 mm. It should be understood that in various embodiments, the surface angle 1105, the width 1161, the height 1163, and the length 1165 can be defined as needed for a particular implementation of the beam steering structure 1101.

A reflecting system 1113 is disposed on the angled optical surface 1103 to extend over at least an area of the angled optical surface 1103 upon which an input optical beam 1107 is incident. In some embodiments, the reflecting system 1113 can be formed as a multilayer stack of materials, such as a multilayer stack of films and/or coatings. The reflecting system 1113 functions to reflect the input optical beam 1107 into a reflected beam 1115 directed toward a use device 1116, such as a photonic chip. In some embodiments, the reflecting system 1113 is configured so that the reflected beam 1115 includes a first reflected beam 1115A of a first polarization and a second reflected beam 1115B of a second polarization, where the first reflected beam 1115A is separated from the second reflected beam 1115B by a beam spacing 1117. The beam spacing 1117 is large enough to provide separation of the first reflected beam 1115A and the second reflected beam 1115B into respective optical channels of the use device 1116. In some embodiments, the use device 1116 is a photonic chip that includes optical input couplers separated by the beam spacing 1117. It should also be understood that in some embodiments, the direction of travel of the reflected beam 1115 and the input optical beam 1107 can be reversed, such that the reversed version of the reflected beam 1115 is reflected by the reflecting system 1113 on the angled optical surface 1103 into a core of an optical fiber.

The beam steering structure 1101 includes a v-groove array 1111 that has multiple v-grooves oriented to extend parallel to each other, with each v-groove configured to receive one optical fiber 1109. In some embodiments, the v-groove array 1111 is formed integrally with the beam steering structure 1101. The v-groove array 1111 facilitates placement of optical fibers 1109 that respectively define multiple input optical beams 1107. In some embodiments, the v-groove array 1111 is configured to receive an array of optical fibers 1109. In some embodiments, the array of optical fibers 1109 can be configured as a ribbon of optical fibers 1109. In some embodiments, one or more of the optical fibers 1109 can include an optical lensing element, such as a GRIN lens or graded-index optical fiber. And, in some embodiments, the optical lensing element can cause the input optical beam 1107 to converge as it enters the beam steering structure 1101 and approaches the optical surface 1103.

Figure 11E:
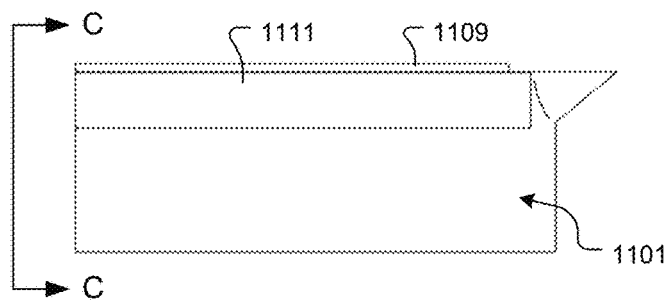
FIG. 11E shows a close-up side view of the beam steering structure of FIG. 11A, with one of the optical fibers positioned in one of the v-grooves of the v-groove array, in accordance with some embodiments.
Figure 11F:
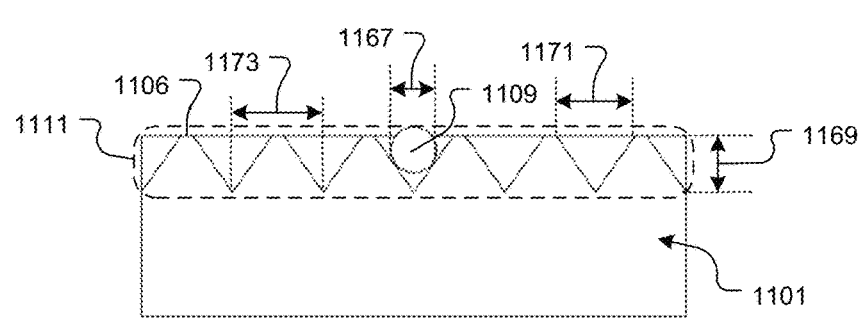
FIG. 11F shows an end view of the beam steering structure, with one of the optical fibers positioned in one of the v-grooves of the v-groove array, corresponding to view C-C as referenced in FIG. 11E, in accordance with some embodiments.
Figure 11G:
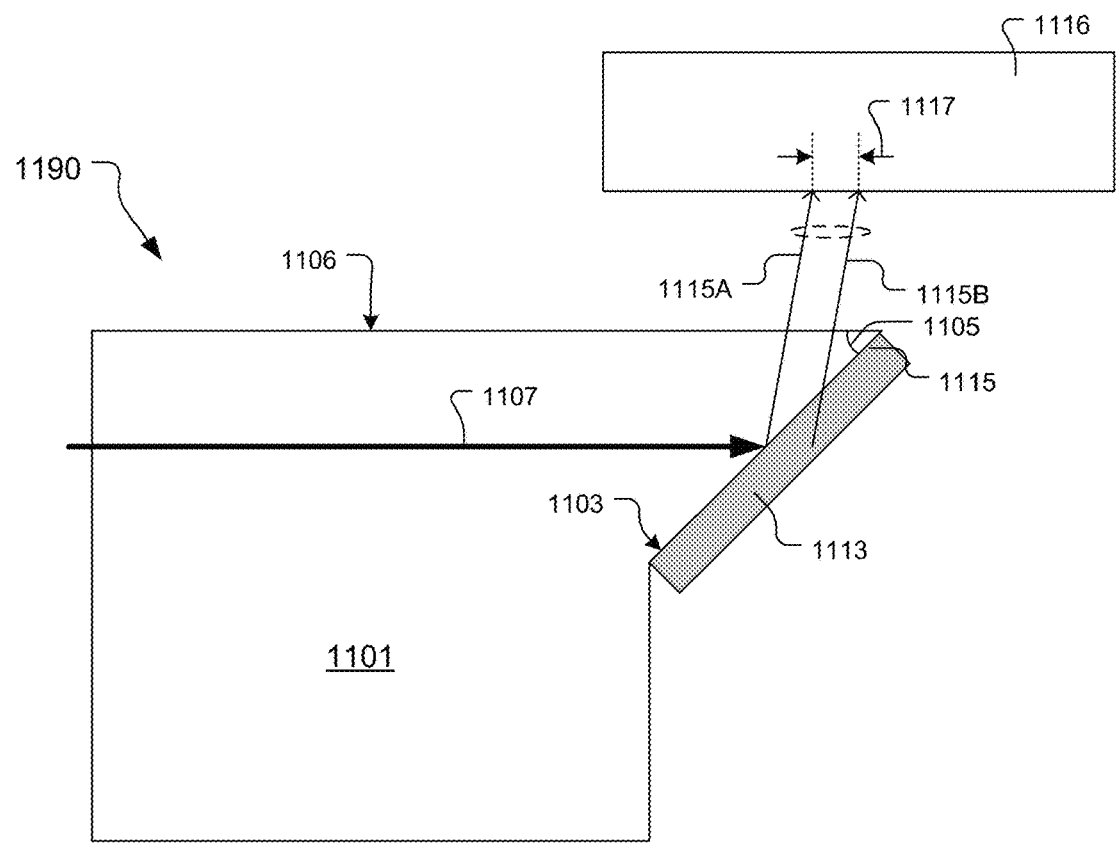
FIG. 11G shows a close-up view of the area as referenced in FIG. 11C, in accordance with some embodiments.

FIG. 11E shows a close-up side view of the beam steering structure 1101, with one of the optical fibers 1109 positioned in one of the v-grooves of the v-groove array 1111, in accordance with some embodiments. FIG. 11F shows an end view of the beam steering structure 1101, with one of the optical fibers 1109 positioned in one of the v-grooves of the v-groove array 1111, corresponding to view C-C as referenced in FIG. 11E, in accordance with some embodiments. In some embodiments, the v-groove array 1111 is configured to receive optical fibers 1109 that have a diameter 1167 of about 0.125 mm. In these embodiments, the v-grooves of the v-groove array 1111 can be configured to have a depth 1169 of about 0.156 mm. Also, in these embodiments, the v-grooves of the v-groove array 1111 can be configured to have an opening width 1171 of about 0.218 mm at the top surface 1106 of the beam steering structure 1101. Also, in these embodiments, the v-grooves of the v-groove array 1111 can be configured to have a pitch 1173 of about 0.250 mm, where the pitch is measured between and perpendicular the centerlines of adjacent v-grooves of the v-groove array 1111 and in a plane parallel with the top surface 1106 of the beam steering structure 1101. It should be understood that in various embodiments, the depth 1169, the opening width 1171, and the pitch 1173 of the v-groove array 1111 can be defined as needed for a specified optical fiber 1109 diameter 1167 (which may be either less than or greater than 0.125 mm) and for a specified optical grating coupler spacing/configuration on the use device 1116. Therefore, in various embodiments, the depth 1169 can be either less than or greater than 0.156 mm, and/or the opening width 1171 can be either less than or greater than 0.218 mm, and/or the pitch 1173 can be either less than or greater than 0.250 mm. Also, in some embodiments, one or more of the depth 1169, the opening width 1171, and the pitch 1173 can be different for different v-grooves of the v-groove array 1111.

Figure 12:
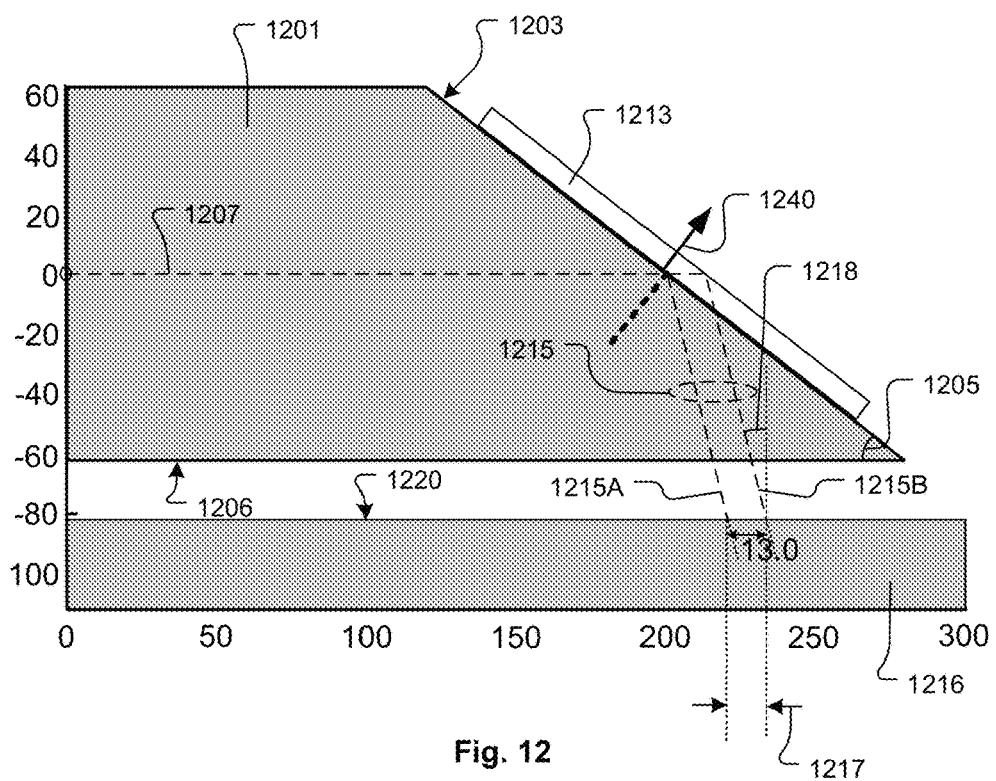
FIG. 12 shows a schematic of a vertical cross-section of a beam steering structure positioned substantially parallel to a use device, in accordance with some embodiments.

FIG. 12 shows a schematic of a vertical cross-section of a beam steering structure 1201 positioned substantially parallel to a use device 1216, in accordance with some embodiments. The beam steering structure 1201 includes an angled optical surface 1203 angled at a surface angle 1205 measured relative to a bottom surface 1206 of a base of the beam steering structure 1201. A reflecting system 1213 is disposed on the angled optical surface 1203 to extend over at least an area of the angled optical surface 1203 upon which an input optical beam 1207 is incident. In some embodiments, the reflecting system 1213 can be formed as a multilayer stack of materials, such as a multilayer stack of films and/or coatings. The reflecting system 1213 functions to reflect the input optical beam 1207 into a reflected beam 1215 directed toward the use device 1216, such as a photonic chip. The reflected beam 1215 includes a first reflected beam 1215A of a first polarization and a second reflected beam 1215B of a second polarization. The first reflected beam 1215A is separated from the second reflected beam 1215B by a beam spacing 1217. The beam spacing 1217 is large enough to provide separation of the first reflected beam 1215A and the second reflected beam 1215B into respective optical channels of the use device 1216. In some embodiments, the use device 1216 is a photonic chip that includes optical input couplers separated by the beam spacing 1217. The example beam steering structure 1201 is configured to have a chip incidence angle 1218 of about 14 degrees. The chip incidence angle 1218 is measured between the direction of travel of the reflected beam 1215 (either 1215A or 1215B) and a vector perpendicular to a surface of optical incidence 1220 on the use device 1216 and within a reference plane that is coincident with the direction of travel of the input optical beam 1215 and perpendicular to the surface of optical incidence 1220 on the use device 1216.

Figure 13:
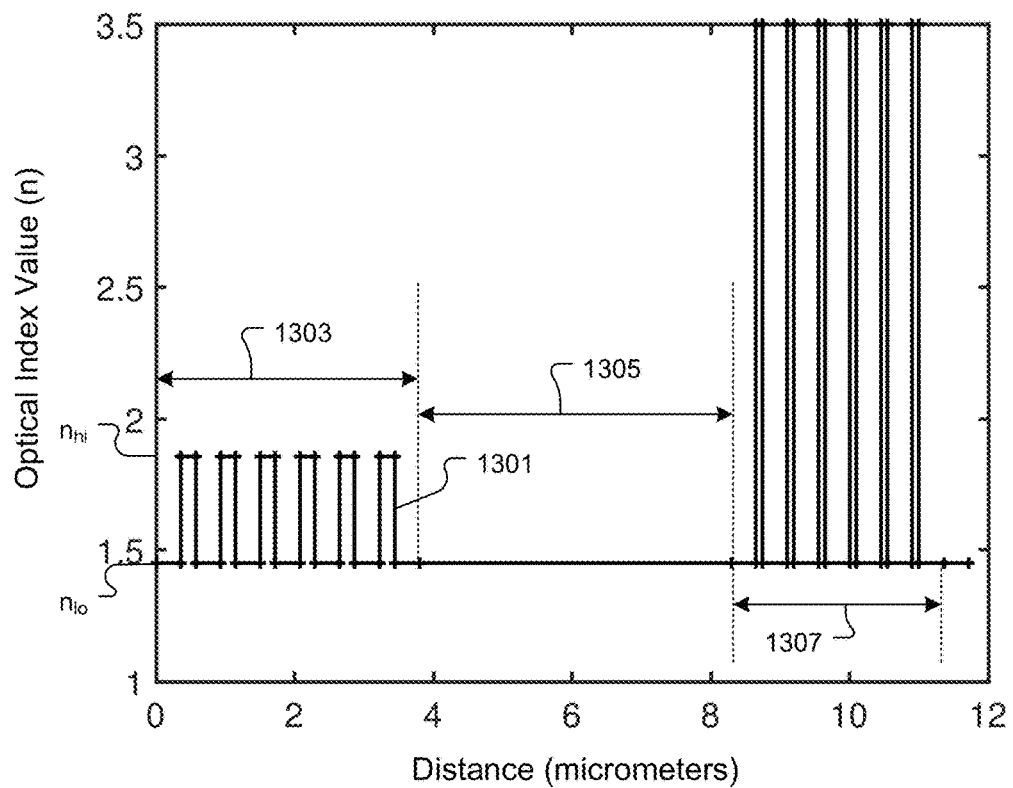
FIG. 13 shows a configuration of the reflecting system, in accordance with some embodiments.

FIG. 13 shows a configuration of the reflecting system 1213, in accordance with some embodiments. The horizontal axis in FIG. 13 shows distance as measured perpendicularly away from the angled optical surface 1203 along the vector 1240 as shown in FIG. 12. The vertical axis in FIG. 13 shows the optical index value of the material within the reflecting system 1213. Therefore, the curve 1301 shown in FIG. 13 shows the optical index value of the materials within the reflecting system 1213 as a function of distance measured perpendicularly away from the angled optical surface 1203 along the vector 1240. Each change in optical index value within the reflecting system 1213 represents a transition between different material layers/films that collectively form the reflecting system 1213. FIG. 13 shows that the reflecting system 1213 includes a first reflecting region 1303, a spacer region 1305, and a second reflecting region 1307.

As shown in FIG. 13, for the beam steering structure 1201, the Brewster condition is met for $n_{lo}=1.45$ and $n_{hi}=1.86$ within the first reflective region 1303. Also, as shown in FIG. 13, the second reflective region 1307 includes multiple layers/films of a high-index material (n=3.5), such as silicon. In various embodiments, the second reflective region 1307 can be formed of many different types of highly reflecting materials. In some embodiments, the second reflective region 13070 can be formed using a metal layer. At least one material used in the second reflecting region 1307 should have an optical index value substantially different from the materials used in the first reflecting region 1303. Also, FIG. 13 shows that the spacer region 1305 separates the first reflective region 1303 and the second reflective region 1307. In the reflecting system 1213, the spacer region 1305 has a thickness of about 5 micrometers, which provides for a reflected beam shift greater than about 10 micrometers, where the reflected beam shift corresponds to the beam spacing 1217 between the first reflected beam 1215A and the second reflected beam 1215B. In some embodiments, non-linear phase in the reflected beam 1215 can be minimized to avoid beam distortion, and can be further improved by numerical or empirical optimization.

Figure 14:
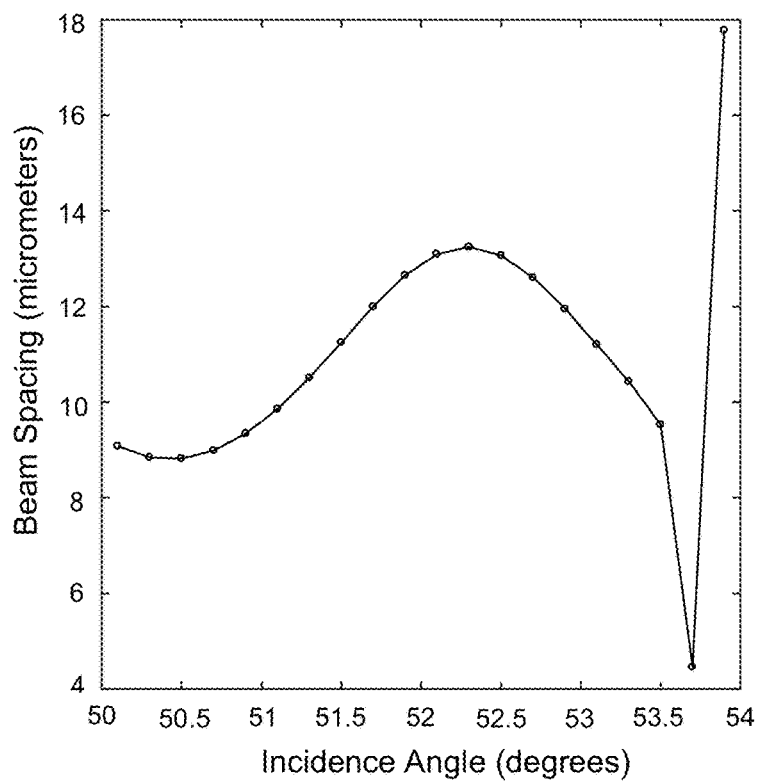
FIG. 14 shows a plot of beam spacing as a function of the incidence angle between in input optical beam and the direction normal to angled optical surface for the beam steering structure having the reflecting system parameters of FIG. 12, in accordance with some embodiments.
Figure 15:
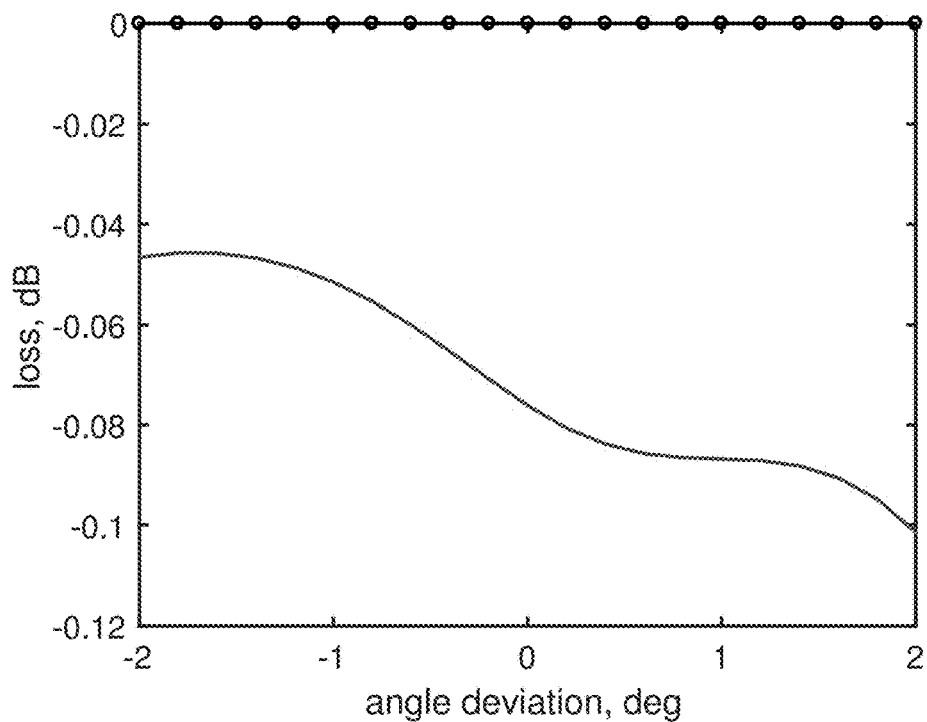
FIG. 15 shows a plot of light loss (dB) as a function of angle deviation for the beam steering structure, where the angle deviation is defined as the difference between the incidence angle and the nominal designed angle, in accordance with some embodiments.

A rough approximation of the beam spacing 1217 can be made using geometric drawings of the beam steering structure 1201, such as shown in FIG. 12. And, improved estimates of the beam spacing 1217 can be extracted from the phase of the simulated reflectance. FIG. 14 shows a plot of beam spacing 1217 as a function of the incidence angle between in input optical beam 1207 and the direction normal to angled optical surface for the beam steering structure 1201 having the reflecting system 1213 parameters of FIG. 12, in accordance with some embodiments. FIG. 15 shows a plot of light loss (dB) as a function of angle deviation for the beam steering structure 1201, where the angle deviation is defined as the difference between the incidence angle and the nominal designed angle, in accordance with some embodiments. It is understood that an optical beam typically can be decomposed into components with different incidence angle and may typically have small misalignment, and so optical properties (loss, beam spacing) should be suitable over a range of angular deviation.

Figure 16:
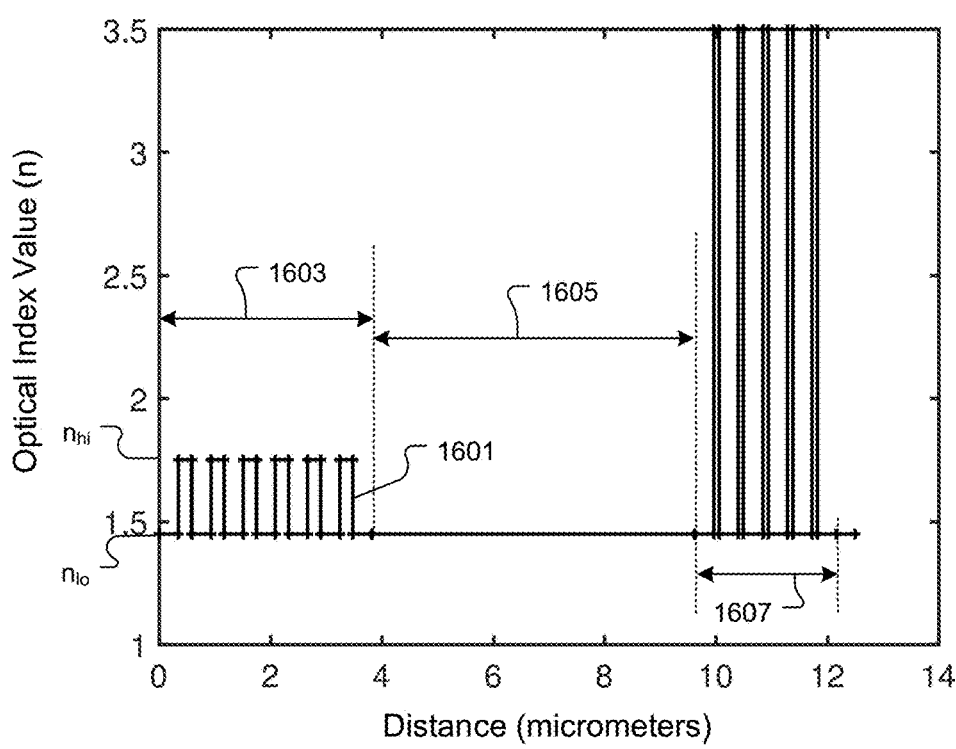
FIG. 16 shows another configuration of the reflecting system, in accordance with some embodiments.
Figure 17:
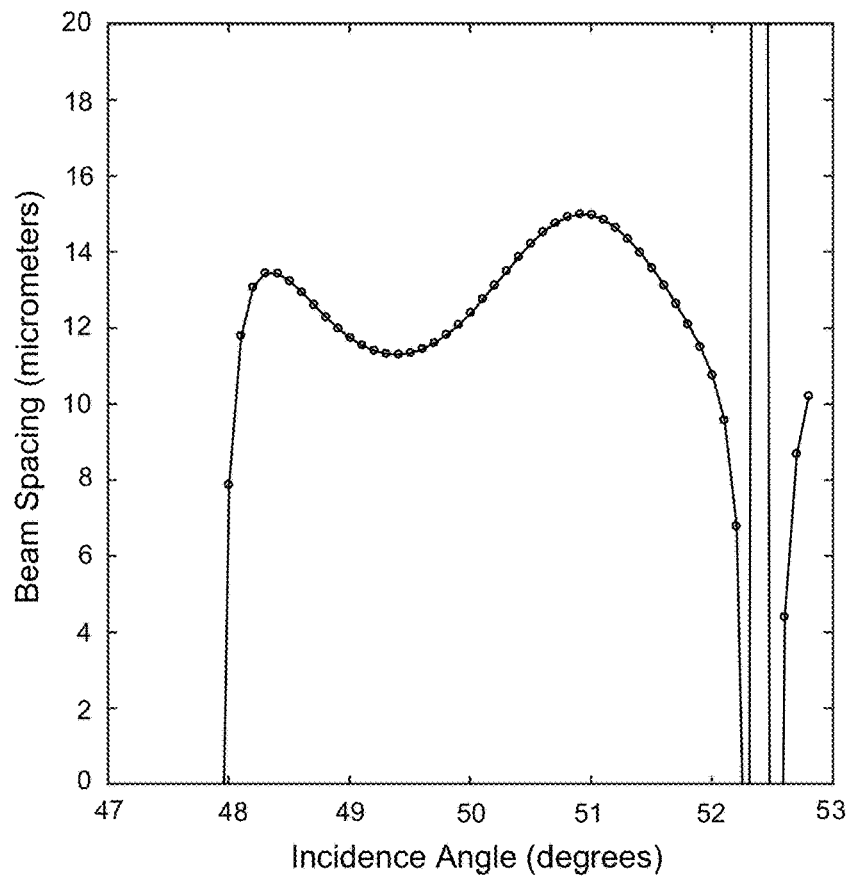
FIG. 17 shows a plot of beam spacing as a function of the incidence angle for the beam steering structure having the reflecting system parameters of FIG. 16, in accordance with some embodiments.

FIG. 16 shows another configuration of the reflecting system 1213, in accordance with some embodiments. As with FIG. 13, the curve 1601 shown in FIG. 16 shows the optical index value of the materials within the reflecting system 1213 as a function of distance measured perpendicularly away from the angled optical surface 1203 along the vector 1240. FIG. 16 shows that the reflecting system 1213 includes a first reflecting region 1603, a spacer region 1605, and a second reflecting region 1607. As shown in FIG. 16, for the beam steering structure 1201, $n_{lo}$=1.45 and $n_{hi}$=1.75 (alumina) within the first reflective region 1603. Also, as shown in FIG. 16, the second reflective region 1607 includes multiple layers/films of a high-index material (n=3.5) (silicon). FIG. 16 also shows that the spacer region 1605 has a thickness of 5.8 micrometers. With the parameters as shown in FIG. 16 for the reflecting system 1213, the Brewster condition is met with the surface angle 1205 set to 39.6 degrees and with the chip incidence angle 1218 set to 10.7 degrees. Also, with these settings the beam spacing 1217 is about 13 micrometers. In some embodiments, the beam spacing 1217 can have artifacts that manifest with a sensitivity to the spacer region 1305, 1605 thickness. Therefore, in some embodiments, a total thickness of the reflecting system 1213 can be controlled in order to improve fabrication sensitivity and beam distortion. FIG. 17 shows a plot of beam spacing 1217 as a function of the incidence angle for the beam steering structure 1201 having the reflecting system 1213 parameters of FIG. 16, in accordance with some embodiments.

Figure 18:
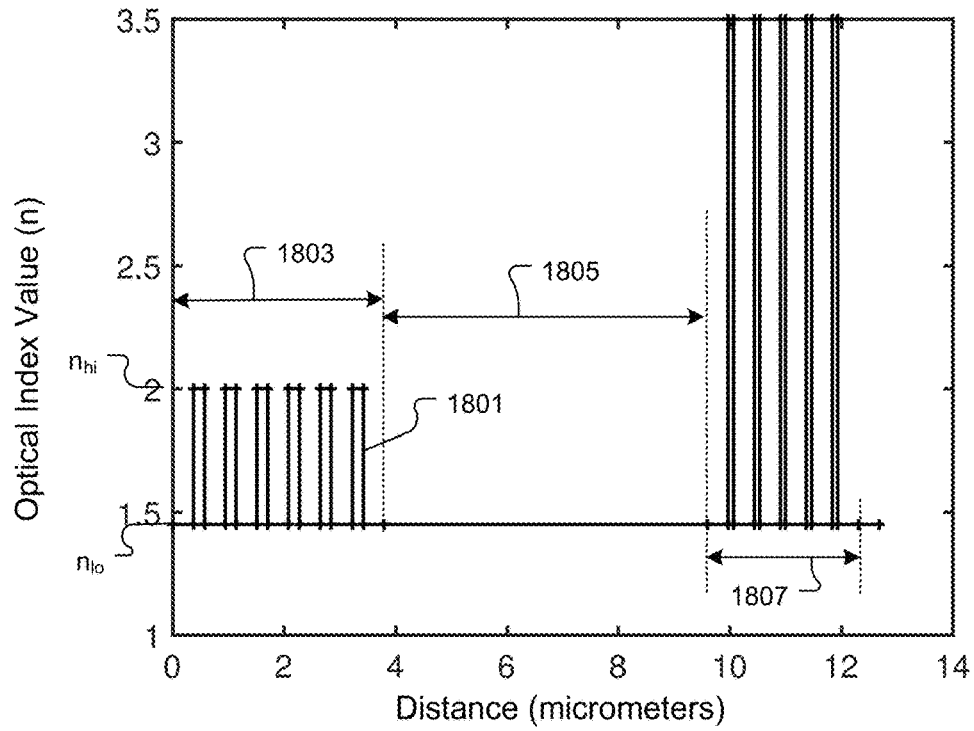
FIG. 18 shows another configuration of the reflecting system of FIG. 12, in accordance with some embodiments.

FIG. 18 shows another configuration of the reflecting system 1213, in accordance with some embodiments. As with FIG. 13, the curve 1801 shown in FIG. 18 shows the optical index value of the materials within the reflecting system 1213 as a function of distance measured perpendicularly away from the angled optical surface 1203 along the vector 1240. FIG. 18 shows that the reflecting system 1213 includes a first reflecting region 1803, a spacer region 1805, and a second reflecting region 1807. As shown in FIG. 18, for the beam steering structure 1201, $n_{lo}$=1.45 and $n_{hi}$=2.0 (silicon nitride) within the first reflective region 1803. Also, as shown in FIG. 18, the second reflective region 1807 includes multiple layers/films of a high-index material (n=3.5) (silicon). FIG. 18 also shows that the spacer region 1805 has a thickness of 5.8 micrometers.

Figure 19:
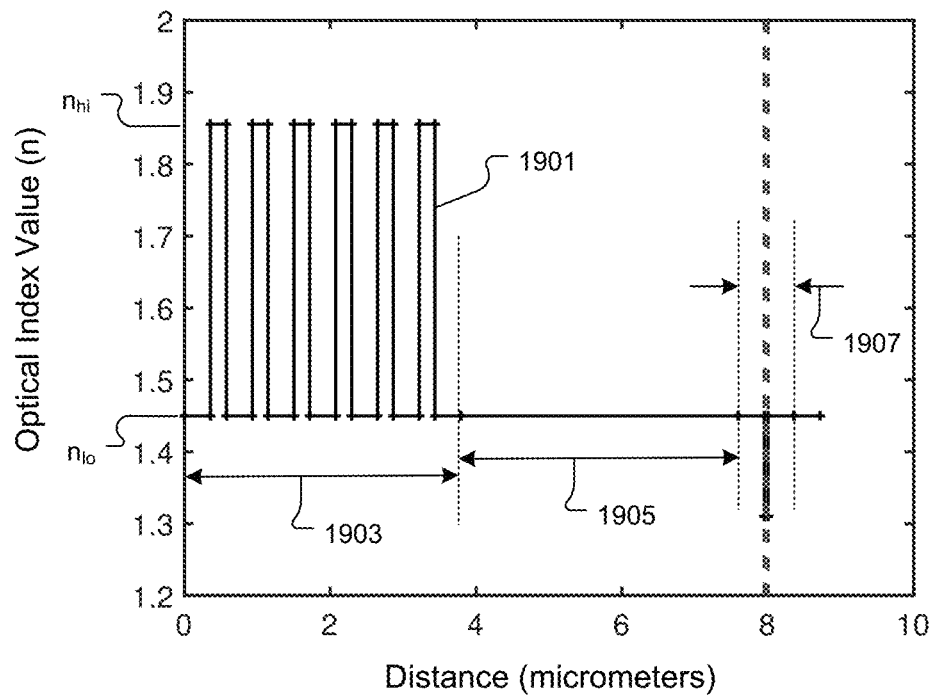
FIG. 19 shows another configuration of the reflecting system of FIG. 12, in accordance with some embodiments.

FIG. 19 shows another configuration of the reflecting system 1213, in accordance with some embodiments. As with FIG. 13, the curve 1901 shown in FIG. 19 shows the optical index value of the materials within the reflecting system 1213 as a function of distance measured perpendicularly away from the angled optical surface 1203 along the vector 1240. FIG. 19 shows that the reflecting system 1213 includes a first reflecting region 1903, a spacer region 1905, and a second reflecting region 1907. As shown in FIG. 19, for the beam steering structure 1201, $n_{lo}$=1.45 (silica) and $n_{hi}$=1.85 within the first reflective region 1903. Also, as shown in FIG. 19, the second reflective region 1907 is formed by a metal coating, as indicated by the dashed vertical line. In some embodiments, the metal coating of the second reflective region 1907 is a layer of aluminum (nhigher~1.3+i12.3).

Figure 20:
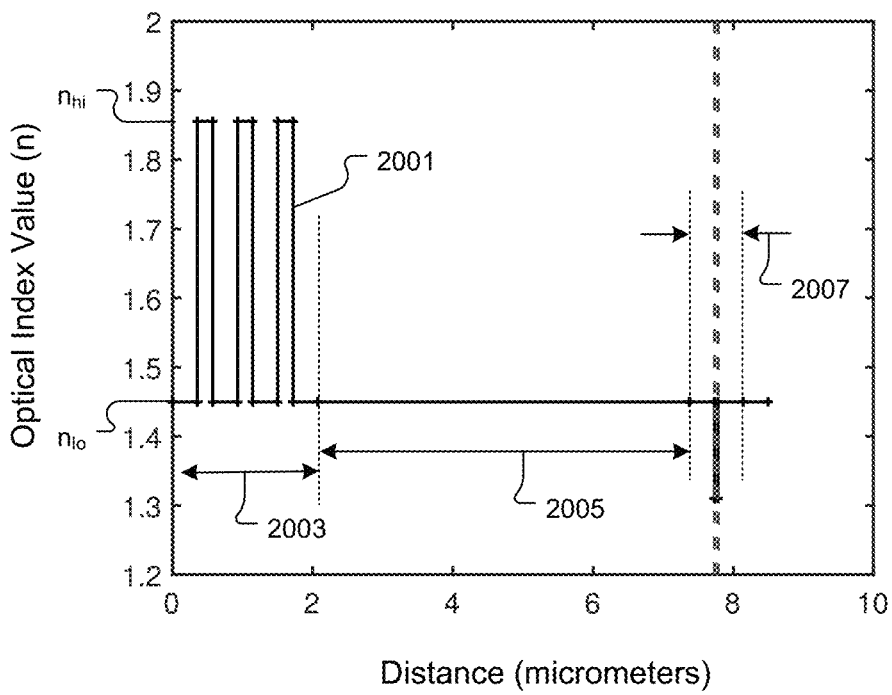
FIG. 20 shows a variation of the reflecting system configuration of FIG. 19, in which the first reflecting region is reduced in thickness, in accordance with some embodiments.

FIG. 20 shows a variation of the reflecting system 1213 configuration of FIG. 19, in which the first reflecting region 1903 is reduced in thickness, in accordance with some embodiments. This example shows how a desired performance of the reflecting system 1213 can be achieved with a limited total thickness of the reflecting system 1213. In some embodiments, fabrication capabilities may limit the total thickness of the reflecting system 1213. For example, in some embodiments, the total thickness of the reflecting system 1213 may be limited to about 8 micrometers. Simulation results indicate that the beam spacing 1217 can be about 10 micrometers when the total thickness of the reflecting system 1213 is limited to about 8 micrometers. It should be appreciated that there is a tradeoff between ease of fabrication and light coupling loss through the beam steering structure 1201.

FIG. 21 shows a flowchart of a method for optical beam turning in an optical data communication system, in accordance with some embodiments. The method includes an operation 2101 for positioning an optical fiber (109, 313, 413, 909, 1009) in an alignment structure (111, 311, 411, 911, 1011) of a beam steering structure (101, 301, 401, 901, 1001) such that an axis of a core of the optical fiber (109, 313, 413, 909, 1009) is oriented in a first direction (107, 315, 415, 907, 1007) within the alignment structure (111, 311, 411, 911, 1011). The first direction (107, 315, 415, 907, 1007) is oriented toward a reflecting system (113, 309, 409, 913, 1013) positioned on an angled optical surface (103, 307, 407, 903, 1003) of an end portion (102, 305, 405, end of 901, end of 1001) of the beam steering structure (101, 301, 401, 901, 1001). The angled optical surface (103, 307, 407, 903, 1003) is oriented at a non-zero angle relative to the first direction (107, 315, 415, 907, 1007). The reflecting system (113, 309, 409, 913, 1013) is configured to reflect incident light propagating along the first direction (107, 315, 415, 907, 1007) into a first reflected beam (115A, 317A, 417A, 915A, 1015A) of a first polarization and a second reflected beam (115B, 317B, 417B, 915B, 1015B) of a second polarization. The first reflected beam (115A, 317A, 417A, 915A, 1015A) and the second reflected beam (115B, 317B, 417A, 915B, 1015B) are separated by a beam spacing (117, 321, 421, 917, 1017) sized to direct the first reflected beam (115A, 317A, 417A, 915A, 1015A) into a first optical communication channel and to direct the second reflected beam (115B, 317B, 417B, 915B, 1015B) into a second optical communication channel. The method also includes an operation 2103 for transmitting light through the optical fiber (109, 313, 413, 909, 1009) so that the light travels from the optical fiber (109, 313, 413, 909, 1009) in the first direction (107, 315, 415, 907, 1007) and is incident upon the reflecting system (113, 309, 409, 913, 1013). The light incident upon the reflecting system (113, 309, 409, 913, 1013) is split into the first reflected beam (115A, 317A, 417A, 915A, 1015A) and the second reflected beam (115B, 317B, 417B, 915B, 1015B).

In some embodiments, the reflecting system (113, 309, 409, 913, 1013) is configured to set the beam spacing (117, 321, 421, 917, 1017) to a size that causes the first reflected beam (115A, 317A, 417A, 915A, 1015A) to travel into a first optical grating coupler of a photonic chip and that causes the second reflected beam (115B, 317B, 417B, 915B, 1015B) to travel into a second optical grating coupler of the photonic chip. In some embodiments, the alignment structure (111, 311, 411, 911, 1011) is shaped to receive and align the optical fiber (109, 313, 413, 909, 1009) such that the first direction (107, 315, 415, 907, 1007) is substantially parallel to a surface of optical incidence of the photonic chip. In some embodiments, the alignment structure (111, 311, 411, 911, 1011) is shaped to receive and align the optical fiber (109, 313, 413, 909, 1009) such that the first direction (107, 315, 415, 907, 1007) is not parallel to a surface of optical incidence of the photonic chip.

In some embodiments, the method includes an operation for disposing a fill material between the beam steering structure (101, 301, 401, 901, 1001) and the photonic chip such that the fill material secures the beam steering structure (101, 301, 401, 901, 1001) in a fixed spatial relationship with the photonic chip. In some embodiments, the method includes an operation for positioning an optical lensing element (106) between the optical fiber (109, 313, 413, 909, 1009) in the alignment structure (111, 311, 411, 911, 1011) and the end portion (102, 305, 405, end of 901, end of 1001) of the beam steering structure (101, 301, 401, 901, 1001). In some embodiments, the optical lensing element (106) is positioned and configured to direct convergence at a beam waist of the light propagating along the first direction (107, 315, 415, 907, 1007) through the end portion (102, 305, 405, end of 901, end of 1001) of the beam steering structure (101, 301, 401, 901, 1001). In some embodiments, the optical lensing element (106) is configured to provide high optical coupling efficiency, for example by placing the beam waist near the optical input/grating couplers.

In some embodiments, the reflecting system (113, 309, 409, 913, 1013) includes a first reflecting region that reflects light of the first polarization and passes through light of the second polarization. And, the reflecting system (113, 309, 409, 913, 1013) includes a second reflecting region that reflects light of the second polarization. And, the reflecting system (113, 309, 409, 913, 1013) includes a spacer region positioned between the first reflecting region and the second reflecting region. The spacer region is substantially transparent to light that passes through the first reflecting region.

It should be understood that the beam steering structures (101, 301, 401, 901, 1001) and corresponding reflecting systems (113, 309, 409, 913, 1013) provide for high-density optical fiber-to-photonic chip connectivity with integrated polarization beam splitting. Also, in various embodiments, the beam steering structures (101, 301, 401, 901, 1001) and corresponding reflecting systems (113, 309, 409, 913, 1013) are implemented in various optical fiber-to-photonic chip coupling devices. It should be understood that the beam steering structures (101, 301, 401, 901, 1001) and corresponding reflecting systems (113, 309, 409, 913, 1013) disclosed herein are useful in transmitting signals with two separate polarizations from a single optical fiber to two separate optical grating couplers, respectively. Also, it should be understood that the beam steering structures (101, 301, 401, 901, 1001) and corresponding reflecting systems (113, 309, 409, 913, 1013) disclosed herein are useful in transmitting signals with two separate polarizations, via two separate optical grating couplers, to the same optical fiber.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

Although the foregoing invention has been described in some detail for purposes of clarity of understanding, it will be apparent that certain changes and modifications can be practiced within the scope of the invention description. Accordingly, the present embodiments are to be considered as illustrative and not restrictive, and the invention is not to be limited to the details given herein, but may be modified within the scope and equivalents of the described embodiments.

What is claimed is:

1. A beam-turning assembly, comprising:
   a ramp structure configured to orient an optical fiber such that an optical beam is transmitted from an end of the optical fiber in a first direction, wherein the ramp structure has a first end located proximate to the end of the optical fiber and a second end located opposite the ramp structure from the first end, wherein the ramp structure has a first thickness at the first end and a second thickness at the second end, the second thickness greater than the first thickness, and wherein a surface of the ramp structure against which the optical fiber is positioned extends linearly between the first and second ends of the ramp structure;
   a reflecting system disposed across the first direction, the reflecting system having a planar surface of optical incidence oriented non-perpendicular to the first direction, the reflecting system configured to reflect a first portion of the optical beam transmitted from the end of the optical fiber into a first reflected beam, the reflecting system configured to reflect a second portion of the optical beam transmitted from the end of the optical fiber into a second reflected beam; and
   a support structure to which the ramp structure and the reflecting system are attached, the support structure configured to hold the ramp structure and the reflecting system in a fixed spatial relationship with respect to each other, wherein the first and second thicknesses of the ramp structure control an inclination angle of the first direction relative to a base of the support structure.

2. The beam-turning assembly as recited in claim 1, wherein the reflecting system is oriented to direct the first reflected beam and the second reflected beam to a bottom surface of the support structure.

3. The beam-turning assembly as recited in claim 2, wherein the support structure is configured such that the first reflected beam and the second reflected beam travel through the support structure to reach the bottom surface of the support structure.

4. The beam-turning assembly as recited in claim 2, wherein the optical fiber is positioned between the bottom surface of the support structure and the ramp structure.

5. The beam-turning assembly as recited in claim 2, wherein the ramp structure is positioned between the bottom surface of the support structure and the optical fiber.

6. The beam-turning assembly as recited in claim 1, wherein the beam-turning assembly is positioned next to a use device such that the first reflected beam is directed into a first optical coupler on the use device and such that the second reflected beam is directed into a second optical coupler on the use device.

7. The beam-turning assembly as recited in claim 6, wherein the support structure has a bottom surface oriented substantially parallel to an optical incidence plane of the use device that includes the first optical coupler and the second optical coupler.

8. The beam-turning assembly as recited in claim 7, wherein the first direction is not parallel with the bottom surface of the support structure.

9. The beam-turning assembly as recited in claim 7, further comprising:
   a fill material disposed to hold the support structure in a fixed spatial relationship with the use device.

10. The beam-turning assembly as recited in claim 9, wherein the fill material is disposed between the bottom surface of the support structure and the optical incidence plane of the use device.

11. The beam-turning assembly as recited in claim 1, further comprising:
a fill material disposed to hold the optical fiber in a fixed spatial relationship with the support structure.

12. The beam-turning assembly as recited in claim 1, wherein a portion of the support structure is located between the end of the optical fiber and the reflecting system such that the optical beam travels from the end of the optical fiber through the portion of the support structure to reach the reflecting system.

13. The beam-turning assembly as recited in claim 12, wherein the portion of the support structure includes a surface of optical incidence that faces toward the end of the optical fiber such that the optical beam transmitted from the end of the optical fiber is incident upon the surface of optical incidence of the portion of the support structure, wherein the surface of optical incidence of the portion of the support structure is oriented non-perpendicular to the first direction.

14. The beam-turning assembly as recited in claim 12, wherein the end of the optical fiber is positioned a non-zero distance away from the portion of the support structure.

15. The beam-turning assembly as recited in claim 14, further comprising:
a fill material disposed to hold the optical fiber in a fixed spatial relationship with the support structure, the fill material disposed between the end of the optical fiber and the portion of the support structure such that the optical beam transmitted from the end of the optical fiber travels through the fill material.

16. The beam-turning assembly as recited in claim 15, wherein an optical index of refraction of the fill material is substantially equal to an optical index of refraction of the portion of the support structure.

17. The beam-turning assembly as recited in claim 15, wherein an optical index of refraction of the fill material is substantially equal to an optical index of refraction of a core of the optical fiber.

18. The beam-turning assembly as recited in claim 1, wherein the first reflected beam has a first polarization, and wherein the second reflected beam has a second polarization different than the first polarization.

19. The beam-turning assembly as recited in claim 1, wherein the ramp structure is formed integrally with the support structure.

20. The beam-turning assembly as recited in claim 1, wherein the reflecting system is formed as a multilayer stack of materials including a first reflecting region, a second reflecting region, and a spacer region disposed between the first reflecting region and the second reflecting region.

* * * * *